United States Patent
Toll et al.

(10) Patent No.: US 10,430,193 B2
(45) Date of Patent: *Oct. 1, 2019

(54) PACKED DATA ELEMENT PREDICATION PROCESSORS, METHODS, SYSTEMS, AND INSTRUCTIONS

(71) Applicant: Intel Corporation, Santa Clara, CA (US)

(72) Inventors: Bret L. Toll, Hillsboro, OR (US); Buford M. Guy, Austin, TX (US); Ronak Singhal, Portland, OR (US); Mishali Naik, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,736

(22) Filed: Jun. 1, 2018

(65) Prior Publication Data

US 2018/0293074 A1 Oct. 11, 2018

Related U.S. Application Data

(63) Continuation of application No. 13/931,739, filed on Jun. 28, 2013, now Pat. No. 9,990,202.

(51) Int. Cl.
*G06F 9/30* (2018.01)
(52) U.S. Cl.
CPC ...... *G06F 9/30189* (2013.01); *G06F 9/30018* (2013.01); *G06F 9/30036* (2013.01)
(58) Field of Classification Search
None
See application file for complete search history.

(56) References Cited

U.S. PATENT DOCUMENTS 4,903,228 A 2/1990 Gregoire et al.
5,367,705 A * 11/1994 Sites .................. G06F 9/30018
711/140

(Continued)

FOREIGN PATENT DOCUMENTS

CN 101013359 A 8/2007
CN 102163142 A 8/2011

(Continued)

OTHER PUBLICATIONS

Cheresiz, et al., "Architectural Support for 3D Graphics in the Complex Streamed Instruction Set," IASTED PDCS, Nov. 2002, 6 pages.

(Continued)

*Primary Examiner* — Sultana M Zalalee
(74) *Attorney, Agent, or Firm* — NDWE, LLP

(57) ABSTRACT

A processor includes a first mode where the processor is not to use packed data operation masking, and a second mode where the processor is to use packed data operation masking. A decode unit to decode an unmasked packed data instruction for a given packed data operation in the first mode, and to decode a masked packed data instruction for a masked version of the given packed data operation in the second mode. The instructions have a same instruction length. The masked instruction has bit(s) to specify a mask. Execution unit(s) are coupled with the decode unit. The execution unit(s), in response to the decode unit decoding the unmasked instruction in the first mode, to perform the given packed data operation. The execution unit(s), in response to the decode unit decoding the masked instruction in the second mode, to perform the masked version of the given packed data operation.

22 Claims, 18 Drawing Sheets

(56) References Cited

U.S. PATENT DOCUMENTS

| | | | |
|---|---|---|---|
| 5,781,457 | A | 7/1998 | Cohen et al. |
| 5,787,303 | A | 7/1998 | Ishikawa |
| 6,629,115 | B1 | 9/2003 | Rossignol |
| 7,873,812 | B1 | 1/2011 | Mimar |
| 9,990,202 | B2 * | 6/2018 | Toll ............... G06F 9/30018 |
| 2005/0149701 | A1 | 7/2005 | Chen et al. |
| 2007/0186210 | A1 | 8/2007 | Hussain et al. |
| 2007/0204132 | A1 | 8/2007 | Paver et al. |
| 2009/0172365 | A1 * | 7/2009 | Orenstien ......... G06F 9/30032 712/225 |
| 2009/0300440 | A1 | 12/2009 | Andreev et al. |
| 2013/0238880 | A1 * | 9/2013 | Toichi ............... G06F 9/30018 712/222 |
| 2015/0006858 | A1 | 1/2015 | Toll et al. |

FOREIGN PATENT DOCUMENTS

| | | |
|---|---|---|
| EP | 1267258 A2 | 12/2002 |
| RU | 2117388 C1 | 8/1998 |
| WO | 9708608 A1 | 3/1997 |
| WO | 9950757 A1 | 10/1999 |
| WO | 0122216 A1 | 3/2001 |
| WO | 2013095510 A1 | 6/2013 |
| WO | 2014209687 A1 | 12/2014 |

OTHER PUBLICATIONS

Communication Pursuant to Article 94(3) EPC for Application No. EP14818406.2, dated Mar. 23, 2018, 4 pages.
Extended European Search report for Application No. 14818406.2, dated Feb. 6, 2017, 6 pages.
Final Office Action from U.S. Appl. No. 13/931,739, dated Apr. 13, 2016, 43 pages.
Final Office Action from U.S. Appl. No. 13/931,739, dated Jul. 7, 2017, 26 pages.
First Office Action and Search Report from foreign counterpart Chinese Patent Application No. 201480030905.1, dated Apr. 4, 2018, 10 pages.
International Preliminary Report on Patentability for Application No. PCT/US2014/042797, dated Jan. 7, 2016, 7 pages.
International Search Report and Written Opinion for Application No. PCT/US2014/042797, dated Aug. 29, 2014, 12 pages.
Juurlink B., et al., "Implementation and Evaluation of the Complex Streamed Instruction Set," Proceedings 2001 International Conference on Parallel Architectures and Compilation Techniques, Sep. 2001, 10 pages.
Non-Final Office Action from U.S. Appl. No. 13/931,739, dated Aug. 6, 2015, 20 pages.
Non-Final Office Action from U.S. Appl. No. 13/931,739, dated Nov. 28, 2016, 15 pages.
Notice of Allowance from foreign counterpart Russian Patent Application No. 2015151171, dated Nov. 1, 2016, 11 pages.
Notice of Allowance from foreign counterpart Taiwan Patent application No. 103121588, dated Feb. 2, 2016, 3 pages.
Notice of Allowance from U.S. Appl. No. 13/931,739, dated Feb. 2, 2018, 9 pages.
Office Action from foreign counterpart Korean Patent Application No. 10-2015-7031830, dated Nov. 14, 2016, 14 pages.
Office Action from foreign counterpart Korean Patent Application No. 10-2015-7031830, dated Sep. 29, 2017, 7 pages.
Office Action from foreign counterpart Russian Application No. 2015151171, dated Jun. 30, 2016, 5 pages.
Office Action from foreign counterpart Taiwan Patent Application No. 103121588, dated Jul. 7, 2015, 2 pages.
Second Office Action and Search Report from foreign counterpart Chinese Patent Application No. 201480030905.1, dated Jan. 21, 2019, 7 pages.

* cited by examiner

METHOD PERFORMED
BY PROCESSOR
530

RECEIVE MASKED PACKED DATA INSTRUCTION INDICATING FIRST SOURCE PACKED DATA HAVING FIRST PLURALITY OF DATA ELEMENTS, INDICATING SECOND SOURCE PACKED DATA HAVING SECOND PLURALITY OF DATA ELEMENTS, INDICATING PACKED DATA OPERATION MASK HAVING PLURALITY OF MASK ELEMENTS, AND INDICATING DESTINATION STORAGE LOCATION — 531

STORE RESULT PACKED DATA IN DESTINATION STORAGE LOCATION IN RESPONSE TO MASKED PACKED DATA INSTRUCTION, RESULT PACKED DATA INCLUDING PLURALITY OF RESULT DATA ELEMENTS THAT EACH CORRESPOND TO DIFFERENT ONE OF MASK ELEMENTS IN CORRESPONDING RELATIVE POSITION, RESULT DATA ELEMENTS NOT MASKED OUT BY CORRESPONDING MASK ELEMENTS INCLUDE RESULT OF PACKED DATA OPERATION PERFORMED ON CORRESPONDING PAIR OF DATA ELEMENTS FROM FIRST AND SECOND SOURCE PACKED DATA, WHEREAS RESULT DATA ELEMENTS MASKED OUT BY CORRESPONDING MASK ELEMENTS INCLUDE MASKED OUT VALUE — 532

FIG. 5

NUMBER OF PACKED DATA
OPERATION MASK BITS 636

PACKED DATA OPERATION
MASK REGISTERS 712

FIRST VIEW OF 64-BIT
REGISTER AS HAVING FOUR 16-
BIT PACKED DATA ELEMENTS
940
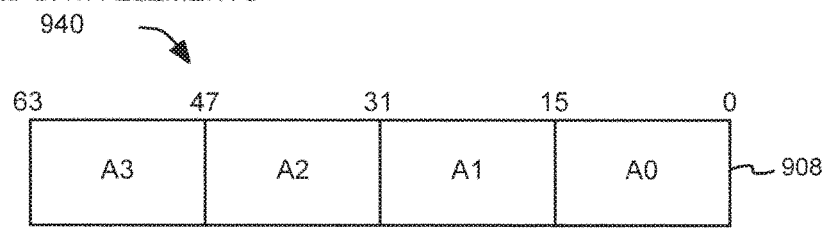
SECOND VIEW OF SAME 64-BIT
REGISTER AS HAVING SINGLE
MASK (M0) 941
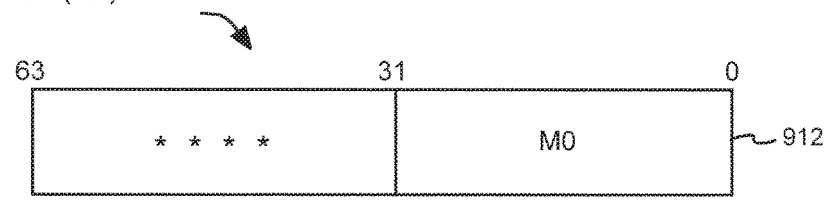
FIG. 9

FIRST VIEW OF 64-BIT
REGISTER AS HAVING FOUR 16-
BIT PACKED DATA ELEMENTS
1042
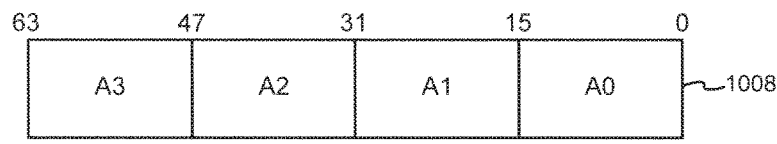
SECOND VIEW OF SAME 64-BIT
REGISTER AS HAVING EIGHT 8-
BIT MASKS 1043
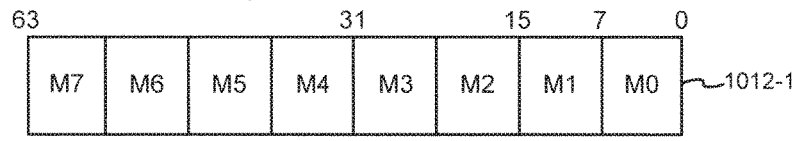
THIRD VIEW OF SAME 64-BIT
REGISTER AS HAVING FOUR
16-BIT MASKS 1044
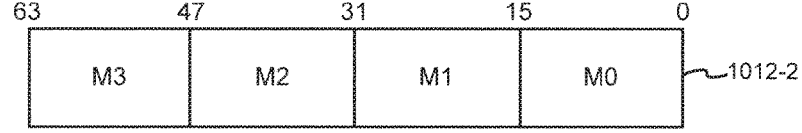
FOURTH VIEW OF SAME 64-BIT
REGISTER AS HAVING TWO 32-
BIT MASKS 1045
FIG. 10

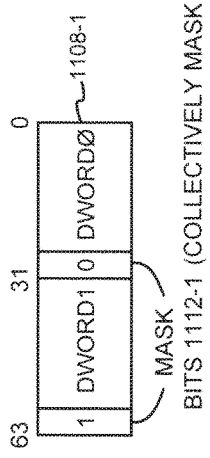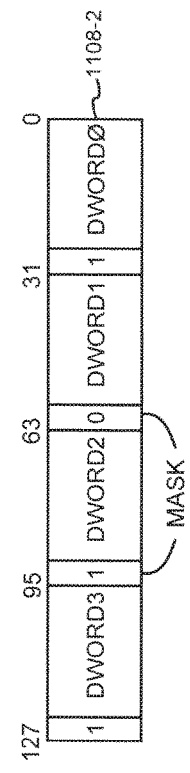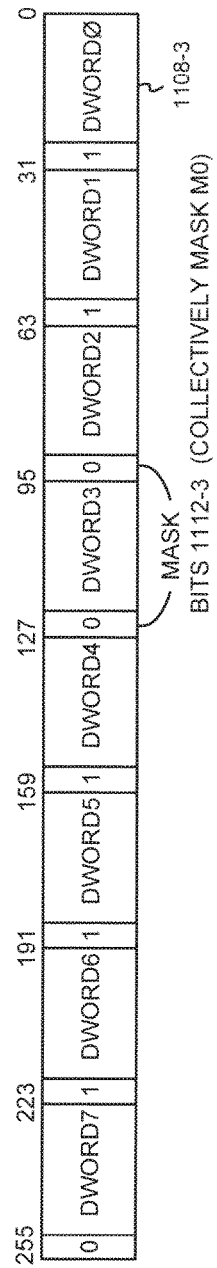
FIG. 11

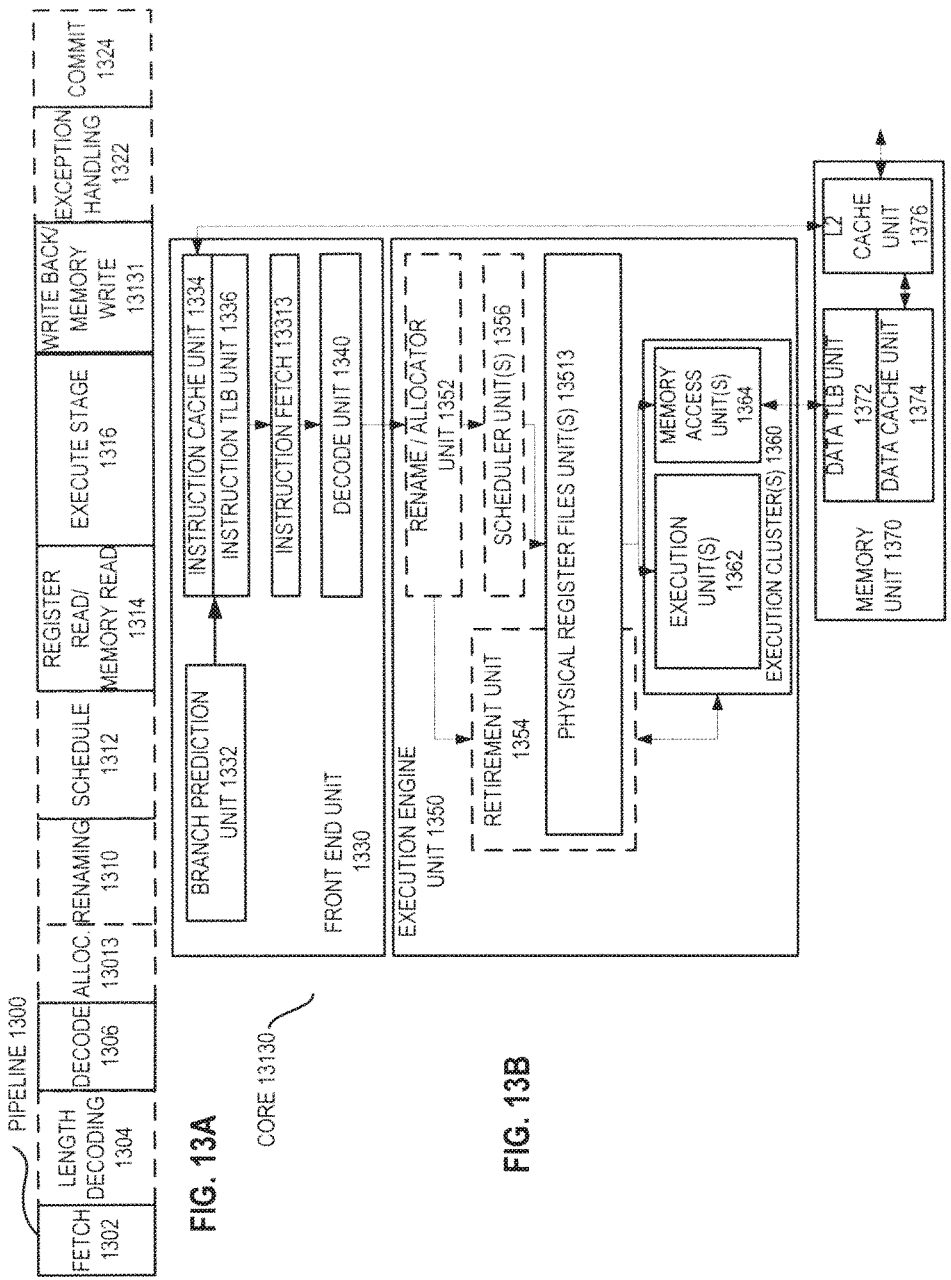

PACKED DATA ELEMENT PREDICATION PROCESSORS, METHODS, SYSTEMS, AND INSTRUCTIONS

CROSS-REFERENCE TO RELATED APPLICATIONS

This application is a continuation of U.S. patent application Ser. No. 13/931,739, titled "PACKED DATA ELEMENT PREDICATION PROCESSORS, METHODS, SYSTEMS, AND INSTRUCTIONS, filed on Jun. 28, 2013, U.S. patent application Ser. No. 13/931,739 is hereby incorporated herein by reference in its entirety.

BACKGROUND

Technical Field

Embodiments described herein generally relate to processors. In particular, embodiments described herein generally relate to processors that are able to process packed data.

Background Information

Many processors have Single Instruction, Multiple Data (SIMD) architectures. In SIMD architectures, instead of a scalar instruction operating on only one data element or pair of data elements, a packed data instruction, vector instruction, or SIMD instruction may operate on multiple data elements or multiple pairs of data elements concurrently (e.g., in parallel). The processor may have parallel execution hardware responsive to the packed data instruction to perform the multiple operations on the multiple data elements concurrently (e.g., in parallel).

In SIMD architectures multiple data elements may be packed within one register or memory location as packed data or vector data. In packed data, the bits of the register or other storage location may be logically divided into a sequence of multiple data elements. Each of the data elements may represent an individual piece of data that is stored in the register or other storage location along with other data elements commonly having the same size. For example, a 128-bit wide register may have two 64-bit wide packed data elements, four 32-bit wide packed data elements, eight 16-bit wide packed data elements, or sixteen 8-bit wide packed data elements. Each of the packed data elements commonly represents a separate individual piece of data (e.g., a color of a pixel, a graphical coordinate, etc.) that may be operated upon separately from the others.

Representatively, one type of packed data instruction, vector instruction, or SIMD instruction (e.g., a packed add instruction) may specify that a single packed data operation (e.g., addition) be performed on all corresponding pairs of data elements from two source packed data operands in a vertical fashion to generate a destination or result packed data. The source packed data operands may be of the same size, may contain data elements of the same width, and thus may each contain the same number of data elements. The source data elements in the same bit positions in the two source packed data operands may represent pairs of corresponding data elements. The packed data operation may be performed separately or substantially independently on each of these pairs of corresponding source data elements to generate a matching number of result data elements, and thus each pair of corresponding source data elements may have a corresponding result data element. Typically, the result data elements for such an instruction are in the same order and they often have the same size.

In addition to this exemplary type of packed data instruction, there are a variety of other types of packed data instructions. For example, there are those that have only one source packed data operand. For example, a packed data shift instruction may independently shift each data element of a single source packed data to produce a result packed data. Other packed data instructions may operate on more than two source packed data operands. Moreover, other packed data instructions may operate in a horizontal fashion on data elements within the same packed data operand instead of in a vertical fashion (e.g., on corresponding data elements between two source packed data operands). Still other packed data instructions may generate a result packed data operand of a different size, having different sized data elements, and/or having a different data element order.

BRIEF DESCRIPTION OF THE DRAWINGS

The invention may best be understood by referring to the following description and accompanying drawings that are used to illustrate embodiments. In the drawings:

FIG. 5 is a block flow diagram of an embodiment of a method of processing an embodiment of a masked packed data instruction.

FIG. 9 is a block diagram illustrating an embodiment in which a same physical register may be logically viewed and/or accessed as either a packed data register or a packed data operation mask register.

FIG. 10 is a block diagram illustrating an embodiment in which a same physical register may be logically viewed and/or accessed as either a packed data register or a packed data operation mask register storing multiple packed data operation masks.

FIG. 11 is a block diagram illustrating an embodiment in which bits of a packed data operation mask are distributed among the data elements of a packed data.

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention.

DETAILED DESCRIPTION OF EMBODIMENTS

Disclosed herein are approaches to predicate or mask operations on packed data elements. In the following description, numerous specific details are set forth (e.g., specific ways of implementing masks, specific mask lengths, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
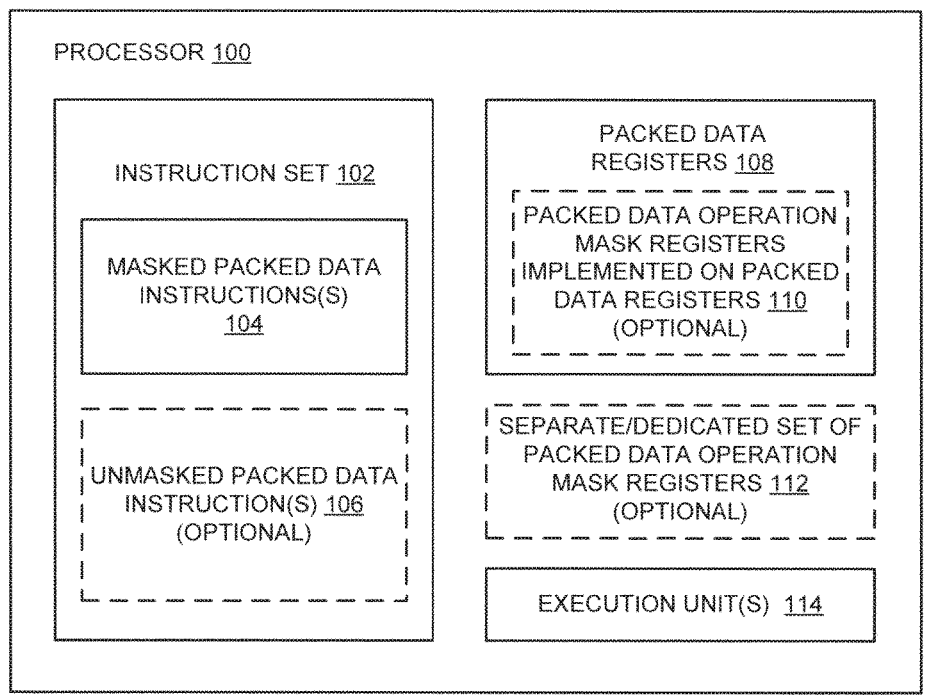
FIG. 1 is a block diagram of an embodiment of a processor.

FIG. 1 is a block diagram of an embodiment of a processor 100. The processor represents an instruction processing apparatus that is operable to process instructions. In some embodiments, the processor may be a general-purpose processor (e.g., a general-purpose microprocessor of the type often used as a central processing unit (CPU) in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely. In some embodiments, the processor may represent a RISC processor that is able to utilize predication or masking for packed data operations.

The processor has an instruction set 102. The instructions of the instruction set represent macroinstructions, assembly language instructions, or machine-level instructions that are provided to the processor for execution, as opposed to microinstructions, micro-ops, or other instructions or control signals decoded or converted from the instructions of the instruction set. In some embodiments (e.g., as in the case of certain RISC processors), the instructions may have a substantially fixed instruction length (e.g., all or at least most instructions may be 32-bits or some other length), as opposed to having a variable instruction length.

As shown, in some embodiments, the instruction set may optionally include one or more unmasked packed data instructions 106 for one or more given unmasked packed data operations. As shown, the instruction set also includes one or more masked packed data instructions 104 for one or more given masked packed data operations. A few illustrative examples of suitable masked and unmasked packed data instructions/operations include, but are not limited to, masked and unmasked packed add instructions/operations, masked and unmasked packed subtract instructions/operations, masked and unmasked packed multiply instructions/operations, masked and unmasked packed shift instructions/operations, masked and unmasked packed rotate instructions/operations, masked and unmasked packed compare instructions/operations, masked and unmasked packed logical OR instructions/operations, masked and unmasked packed logical AND instructions/operations, masked and unmasked packed reciprocal instructions/operations, masked and unmasked packed average instructions/operations, and other masked and unmasked packed arithmetic and/or logical instructions/operations known in the arts.

The processor also includes a set of packed data registers 108. The packed data registers generally represent on-die processor storage locations each operable to store packed data, vector data, or SIMD data. The packed data registers may represent registers that are visible to software and/or a programmer and/or registers that are specified by instructions of the instruction set to identify operands (e.g., source and destination operands). The registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

In some embodiments, the processor may optionally have a set of one or more packed data operation mask registers 110 that are implemented on the packed data registers 108, although this is not required. In some embodiments, the processor may optionally have a set of one or more separate dedicated packed data operation mask registers 112 that are separate from the packed data registers 108. The packed data operation mask registers 110 and/or the packed data operation mask registers 112 may be used to store packed data operation masks. By way of example, the masked packed data instructions may have one or more bits to specify a packed data operation mask, for example, a packed data operation mask register 112 or a packed data register 108. The packed data operation masks may also be referred to herein as predicate masks, or simply masks.

The processor also includes one or more execution units 114. The one or more execution units are operable to execute or process the instructions of the instruction set 102 (e.g., the masked packed data instructions 104). In some embodiments, the execution units may include particular logic (e.g., particular integrated circuitry or other hardware potentially combined with firmware) to execute or process the instructions.

In some embodiments, the processor may have different modes in which masking is or is not used for packed data instructions/operations, although this is not required. For example, the processor may have a first mode in which the processor is not to use packed data operation masking, and a second mode in which the processor is to use packed data operation masking. By way of example, the unmasked packed data instructions may be fetched, decoded, and executed to perform unmasked packed data operations without using masking or packed data operation masks while in the first mode. In contrast, the masked packed data instructions may be fetched, decoded, and executed to perform masked packed data operations using packed data operation masks and masking while in the second mode. The first and second modes may be indicated by one or more bits in a register of the processor (e.g., a control register, configuration register, etc.). Such use of different modes may tend to offer advantages in RISC processors, processors that use a substantially fixed instruction length (e.g., from most to almost all of the instructions have the same instruction length such as 32-bits), processors that have a limited opcode space, and the like. Often, the number of available operation codes in such processors is insufficient to support both unmasked and masked versions of a given packed data operation. By providing a different mode for masked packed data operations, additional instructions may be included to perform masked packed data operations without needing to necessarily increase the length of the opcode. Other embodiments are not limited to using such modes.

Figure 2:
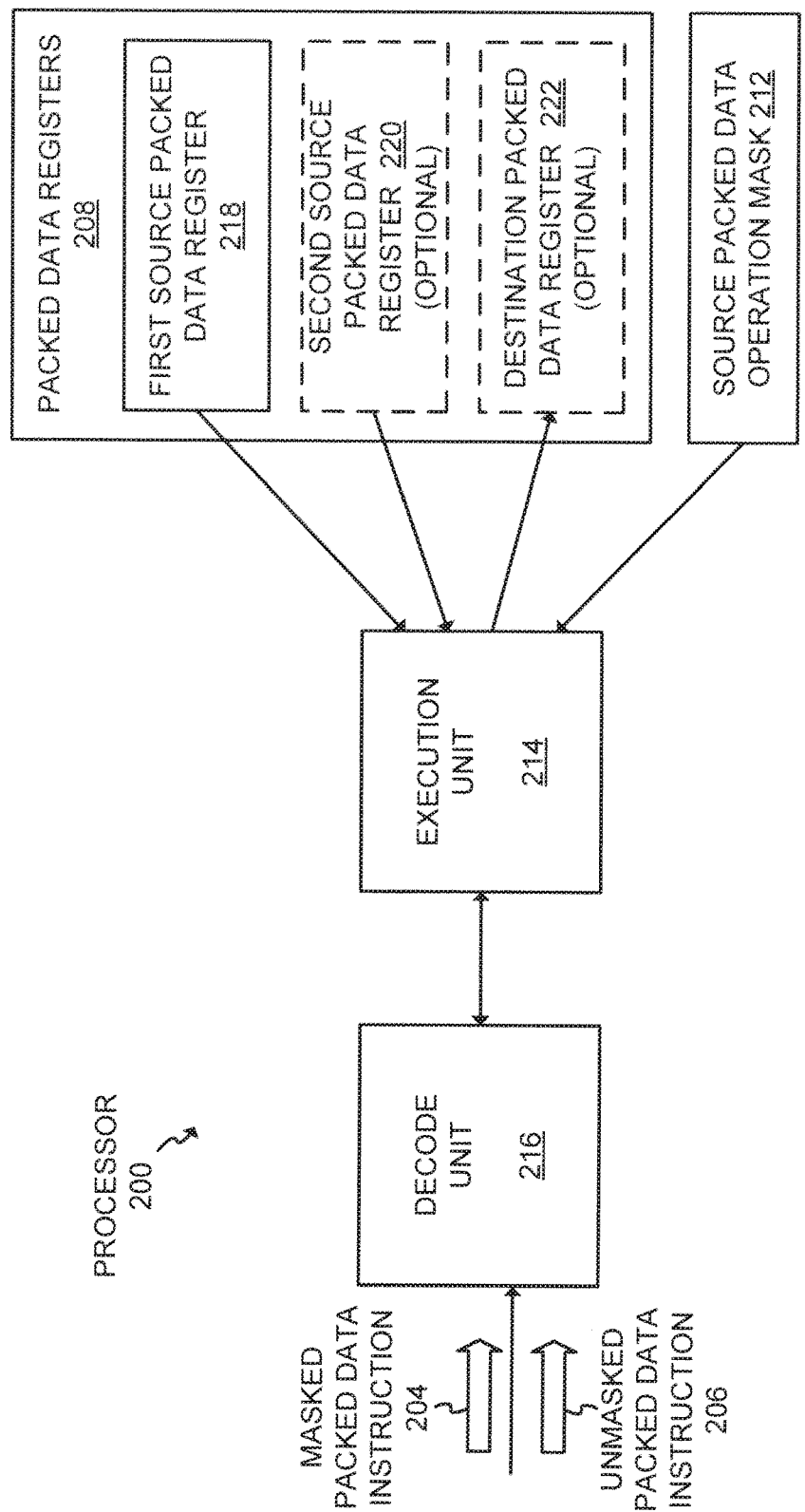
FIG. 2 is a block diagram of another embodiment of a processor.

FIG. 2 is a block diagram of another embodiment of a processor 200. As before, the processor may represent a general-purpose processor or special-purpose processor, and may be any of various RISC, CISC, VLIW, hybrid, or other types of processors. Any of the details and optional details mentioned above for the processor of FIG. 1 may also optionally apply to the processor of FIG. 2.

The processor 200 may receive a masked packed data instruction 204. For example, the instruction may be received from an instruction fetch unit, an instruction queue, or the like. The masked packed data instruction may represent a machine code instruction, assembly language instruction, macroinstruction, or control signal of an instruction set of the processor. Any of the previously mentioned types of masked packed data instructions, as well as other types of masked packed data instructions, are suitable.

The illustrated processor includes an instruction decode unit 216. The instruction decode unit may also be referred to as a decode unit or decoder. The decode unit may receive and decode relatively higher-level instructions (e.g., macroinstructions, machine code instructions, assembly language instructions, etc.), and output one or more relatively lower-level instructions or control signals (e.g., microinstructions, micro-operations, micro-code entry points, etc.) that reflect, represent, and/or are derived from the higher-level instructions. The one or more lower-level instructions or control signals may implement the higher-level instruction through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art.

In other embodiments, an instruction emulator, translator, morpher, interpreter, or other instruction conversion logic may be used. Various different types of instruction conversion logic are known in the arts and may be implemented in software, hardware, firmware, or a combination thereof. The instruction conversion logic may emulate, translate, morph, interpret, or otherwise convert the instruction into one or more corresponding derived instructions or control signals. In some embodiments, both instruction conversion logic and a decode unit may be used. For example, the instruction conversion logic may convert an instruction into one or more intermediate instructions, and the decode unit may decode the one or more intermediate instructions into one or more lower-level instructions or control signals executable by integrated circuitry of the processor. The instruction conversion logic may be located outside the processor (e.g., on a separate die or in memory), on the processor, or a combination.

The processor also includes a set of packed data registers 208. These packed data registers may be similar to the packed data registers 108 described above. The masked packed data instruction 204 may explicitly specify (e.g., through one or more fields or a set of bits), or otherwise indicate (e.g., implicitly indicate), a first source packed data (e.g., a first source packed data register 218). Depending upon the type of instruction, the masked packed data instruction may optionally explicitly specify or otherwise indicate a second source packed data (e.g., a second source packed data register 220). In some cases the masked packed data may optionally specify or otherwise indicate a destination packed data (e.g., a destination packed data register 222). In other embodiments, one or more of these packed data operands may be stored in a memory location or other storage location. Moreover, in other embodiments, one of the source packed data storage locations may be reused as the destination packed data storage location.

In some embodiments, the masked packed data instruction may also specify or otherwise indicate a source packed data operation mask 212 (e.g., a source packed data operation mask register). In the illustrated embodiment, the source packed data operation mask 212 may represent a register that is separate from the packed data registers 208. In another embodiment, the source packed data operation mask may be implemented on the packed data registers 208.

Referring again to FIG. 2, an execution unit 214 is coupled with the decode unit 216, is coupled with the packed data registers 208, and is coupled with the source packed data operation mask 212. In some embodiments, the execution unit may include an arithmetic unit, an arithmetic logic unit, a functional unit, a unit to receive decoded instructions and perform operations, or the like. The execution unit may be operable in response to and/or as a result of the masked packed data instruction 204 (e.g., in response to one or more decoded or otherwise converted instructions or control signals that represent and/or are derived from the masked packed data instruction 204) to perform a masked packed data operation and store a result packed data in the destination packed data operand or register 222. The execution unit and/or the processor may include specific or particular logic (e.g., integrated circuitry or other hardware potentially combined with firmware and/or software) that is responsive to the masked packed data instruction to perform the masked packed data operation.

In some embodiments, the processor may also optionally receive an unmasked packed data instruction 206. The unmasked packed data instruction may be similar to the previously described masked packed data instruction 204 except that it does not need to specify or otherwise indicate the packed data operation mask and except that it does not cause the processor to use masking. Rather, an unmasked packed data operation is performed in response to the unmasked packed data instruction. As previously described, in some embodiments, the processor may have different modes in which masking is or is not used for packed data instructions/operations, although this is not required. For example, the unmasked packed data instruction 206 may be decoded and executed to perform an unmasked packed data operation without using masking or a packed data operation mask while in a first mode. In contrast, the masked packed data instruction 204 may be decoded and executed to perform a masked packed data operation the packed data operation mask 212 while in a second mode. Representatively, the first and second modes may be indicated by one or more bits in a register of the processor (e.g., a control register, configuration register, etc.). Such use of different modes may tend to offer advantages in RISC processors, processors that use a substantially fixed instruction length (e.g., from most to almost all of the instructions have the same instruction length such as 32-bits), processors that have a limited opcode space, and the like. Often, the number of available operation codes in such processors is insufficient to support both unmasked and masked versions of a given packed data operation. By providing a different mode for masked packed data operations, additional instructions may be included to perform masked packed data operations without needing to necessarily increase the length of the opcode. Other embodiments are not limited to using such modes.

The packed data operation mask may represent a predicate operand or conditional control operand, or conditional vector operation control operand. The packed data operation mask may also be referred to herein simply as a mask. The mask may predicate, conditionally control, or mask whether or not operations associated with the masked packed data instruction are to be performed on the source data elements and/or whether or not results of the operations are to be stored in the packed data result. The mask may each include multiple mask elements, predicate elements, or conditional control elements.

In some embodiments, the mask may be operable to mask the operations at per-result data element granularity. In one aspect, the mask elements may be included in one-to-one correspondence with result data elements (e.g., there may be eight result data elements and eight corresponding mask elements). Each different mask element may be operable to mask a different corresponding packed data operation, and/or mask storage of a different corresponding result data element, separately and/or substantially independently of the others. For example, a mask element may be operable to mask whether or not the packed data operation is performed on a corresponding data element of a source packed data (or on a pair of corresponding data elements of two source packed data) and/or whether or not the result of the packed data operation is stored in a corresponding result data element.

Commonly each mask element may be a single bit. The single bit may allow specifying either of two different possibilities. As one example, each bit may specify either that the operation be performed, or that it not be performed. As another example, each bit may specify store a result of the operation versus, do not store a result of the operation. According to one possible convention, each mask bit may have a first value (e.g., set to binary 1) to allow a result of a packed operation to be stored in a corresponding result data element, or may have a second value (e.g., cleared to binary 0) to prevent a result of a packed operation to be stored in a corresponding result data element. The opposite convention is also possible. In other cases, each mask element may have two or more bits (e.g., to specify more than two different possibilities).

In some embodiments, the operation may optionally be performed regardless of the corresponding mask bit or element, but the corresponding results of the operation may, or may not, be stored in the result packed data depending upon the value of the corresponding mask bit or element. Alternatively, in other embodiments, the operation may optionally be omitted (i.e., not performed) if the corresponding mask bit or element is masked out. In some embodiments, exceptions and/or violations may optionally be suppressed for, or not raised by, an operation on a masked-off element. In some embodiments, memory faults corresponding to masked-off data elements may optionally be suppressed or not raised.

To avoid obscuring the description, a relatively simple processor 200 has been shown and described. In other embodiments, the apparatus may optionally include other well-known components found in processors. Examples of such components include, but are not limited to, a branch prediction unit, an instruction fetch unit, instruction and data caches, instruction and data translation lookaside buffers, prefetch buffers, microinstruction queues, microinstruction sequencers, a register renaming unit, an instruction scheduling unit, bus interface units, second or higher level caches, a retirement unit, other components included in processors, and various combinations thereof. There are literally numerous different combinations and configurations of components in processors, and embodiments are not limited to any particular combination or configuration. Embodiments may be included in processors have multiple cores, logical processors, or execution engines at least one of which has execution logic operable to execute an embodiment of a masked packed data instruction disclosed herein.

Figure 3:
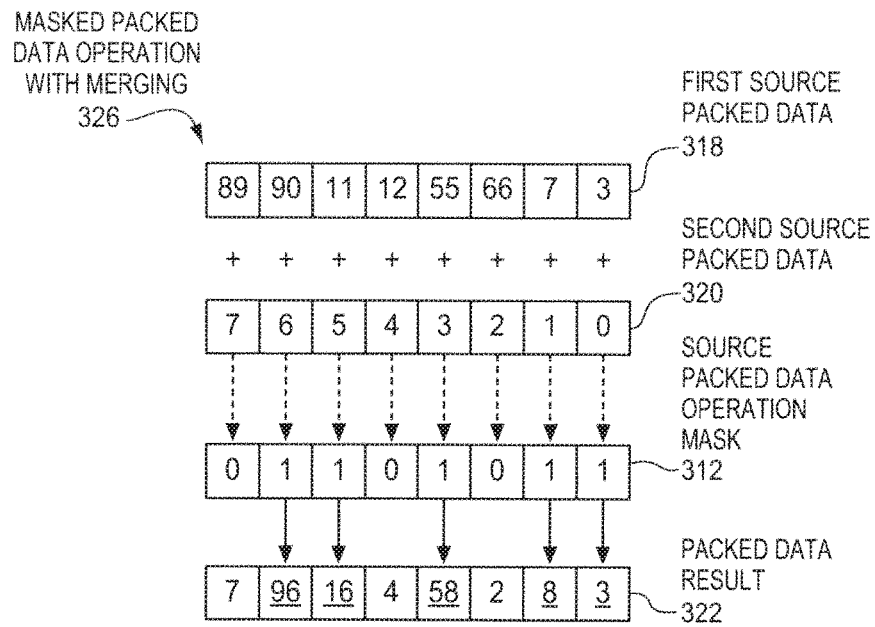
FIG. 3 is a block diagram of an example embodiment of a masked packed data operation with merging.

FIG. 3 is a block diagram of an example embodiment of a masked packed data operation with merging 326. The masked packed data operation may be performed in response to, or as a result of, a masked packed data instruction (e.g., the instructions 104 and/or 204). The masked packed data instruction may indicate a first source packed data 318 and a second source packed data 320. Other masked packed data instructions may indicate only a single source packed data, or more than two source packed data. In the illustration, the first and second source packed data are of the same size, contain data elements of the same width, and thus each contain the same number of data elements, although this is not required. In the illustration, each of the first and second source packed data have eight data elements. As one example, the first and second source packed data may each be 128-bits wide and may each include eight 16-bit data elements, although this is not required. The source data elements in the same relative positions in the two source packed data (e.g., in the same vertical positions) represent pairs of corresponding data elements. Each of the data elements has a numerical value shown within the block representing the data element. For example, the first source packed data 318 has, from the lowest order position on the right to the highest order position on the left, the values "3, 7, 66, 55, 12, 11, 90, 89."

The instruction also indicates a source packed data operation mask 312. In this example, the mask includes eight mask elements, predicate elements, or conditional control elements, which in this example are each a single bit. The bits are included in an ordered one-to-one correspondence with a corresponding pair of source data elements in the first and second source packed data. For example, the lowest-order mask bit (on the right) corresponds to the lowest order pair of corresponding data elements, the highest-order mask bit (on the left) corresponds to the highest order pair of corresponding data elements, and so on. Each mask bit allows performance of the packed data operation on the corresponding pair of source data elements to be predicated or conditionally controlled separately and independently of the others.

The exemplary masked packed data operation is a masked packed data addition operation to conditionally store sums of corresponding pairs of data elements from the first and second source packed data in a packed data result or destination operand 322 according to the packed data operation mask. Each of the eight mask bits of the packed data operation mask is either set (i.e., has a binary value of 1) or is cleared (i.e., has a binary value of 0). According to the illustrated convention, each mask bit is set (i.e., 1) or cleared (i.e., 0), respectively, to allow or not allow a result of the packed data operation (in this case addition), performed on a corresponding pair of source packed data elements, to be stored in a corresponding data element of the packed data result. The set bits (i.e., 1) represent unmasked bits or elements, whereas the cleared bits (i.e., 0) represent masked bits or elements. In the illustrated example, the values of the eight mask bits are, from lowest order position on the right to highest order position on the left, "1, 1, 0, 1, 0, 1, 1, 0". For those mask bits which are set (i.e., 1) a corresponding sum is stored in the corresponding result data element. In the illustration, the sums are underlined. Conversely, for those mask bits which are cleared (i.e., 0), a result of the packed data operation on the corresponding pair of source data elements is not stored in the corresponding result data element. Rather, in the illustrated example, the value of the corresponding data element from the second source packed data 320 is merged stored in the corresponding result data element. This version of masking is referred to as merging-masking. It is to be appreciated that an opposite convention is also possible where bits are cleared (i.e., 0) to allow the results to be stored, or set (i.e., 1) to not allow the results to be stored.

Figure 4:
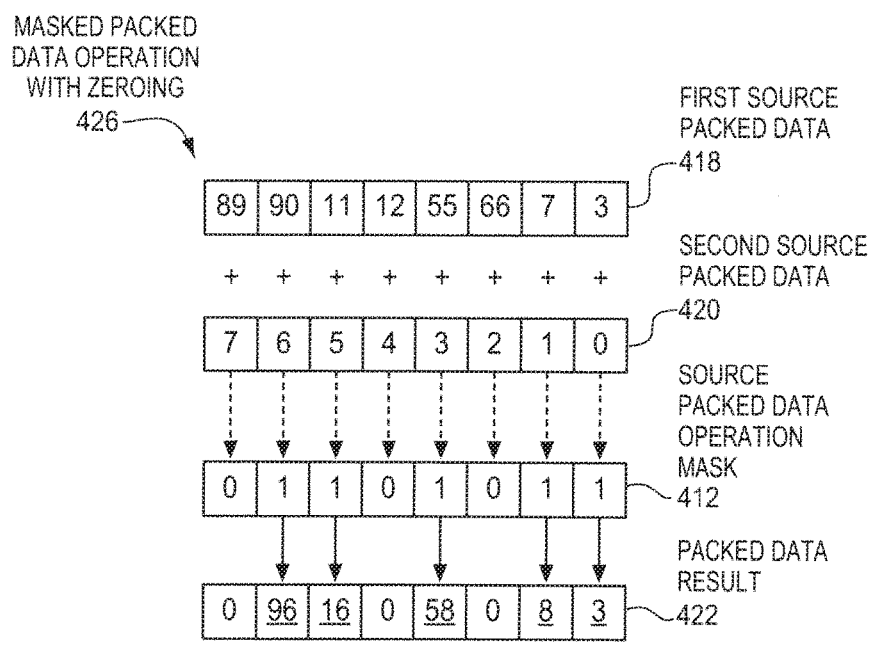
FIG. 4 is a block diagram of an example embodiment of a masked packed data operation with zeroing.

FIG. 4 is a block diagram of an example embodiment of a masked packed data operation with zeroing 426. The masked packed data operation may be performed in response to, or as a result of, a masked packed data instruction (e.g., the instructions 104 and/or 204). The instruction may indicate a first source packed data 418, a second source packed data 420, a source packed data operation mask 412 and a destination storage location 422. The masked packed data operation with zeroing is similar to the aforementioned masked packed data operation with merging. To avoid obscuring the description, the similarities will not be repeated, but rather, the differences will primarily be mentioned.

One notable difference is that, instead of merging or storing values of data elements of a source packed data (e.g., the second source packed data 320 in FIG. 3) into the corresponding result data elements when the corresponding mask bits are masked off or zeroed (e.g., cleared to binary 0), the corresponding result data elements are zeroed out. For example, all of the bits of a result packed data element may be given a value of zero. This is referred to as zeroing-masking. Alternatively, other predetermined values besides zero may optionally be used.

It is to be appreciated that these are just a few illustrative examples of suitable masked packed data operations. In other embodiments, instead of addition, the operation may be a multiplication operation, compare operation, subtraction operation, averaging operation, shift operation, rotate operation, etc. Moreover, in other embodiments, the operation may involve a single source packed data operand, more than two source packed data operands, source packed data operands of different sizes, source packed data having different sizes and/or numbers of data elements, horizontal rather than vertical operations, etc.

In some embodiments, the operations of FIG. 3 and/or FIG. 4 may be performed by and/or within the processor of FIG. 1 and/or the processor of FIG. 2. Alternatively, the operations of FIG. 3 and/or FIG. 4 may be performed by similar or different processors. Moreover, the processor of FIG. 1 and/or the processor of FIG. 2 may perform the same, similar, or different operations than those of FIG. 3 and/or FIG. 4.

FIG. 5 is a block flow diagram of an embodiment of a method 530 of processing an embodiment of a masked packed data instruction. In various embodiments, the method may be performed by and/or within a processor or other instruction processing apparatus. In some embodiments, the method may be performed by the processors of FIG. 1 and/or FIG. 2. Alternatively, the method may be performed by a similar or different processor. Moreover, the processors of FIG. 1 and/or FIG. 2 may perform operations and methods the same as, similar to, or different than those of FIG. 5.

The method includes receiving the masked packed data instruction, at block 531. In various aspects, the instruction may be received at a processor or a portion thereof (e.g., a fetch unit, a decode unit, an instruction queue, etc.). In various aspects, the instruction may be received from an off-die source (e.g., from a main memory, a disc, an interconnect, etc.), or from an on-die source (e.g., from an instruction cache). The masked packed data instruction may specify or otherwise indicate a first source packed data having a first plurality of packed data elements, may specify or otherwise indicate a second source packed data having a second plurality of packed data elements, may specify or otherwise indicate a packed data operation mask having a plurality of mask elements, and may specify or otherwise indicate a destination storage location.

A result packed data may be stored in the indicated destination storage location in response to and/or as a result of the masked packed data instruction, at block 532. The result packed data includes a plurality of result data elements that each correspond to a different one of the mask elements in a corresponding relative position. Result data elements that are not masked out by the corresponding mask element include a result of a packed data operation performed on a corresponding pair of source packed data elements from the first and second source packed data. Result data elements that are masked out by the corresponding mask element include a masked out value, such as, for example, a zeroed out value or a merged value from one of the first and second source packed data.

Figure 6:
FIG. 6 is a table illustrating that the number of packed data operation mask bits depends upon the packed data width and the packed data element width.

FIG. 6 is a table 636 illustrating that the number of packed data operation mask bits depends upon the packed data width and the packed data element width. Packed data widths of 64-bits, 128-bits, 256-bits, and 512-bits are shown. In other embodiments, a subset or superset of these widths may be used, or other widths entirely may be used (e.g., 32-bits, 1024-bits, etc.). Packed data element widths of 8-bit bytes, 16-bit words, 32-bit doublewords (dwords) or single precision floating point (SP), and 64-bit quadwords (Qwords) or double precision floating point (DP) are considered, although other widths are also possible.

As shown, when the packed data width is 64-bits, 8-bits may be used for masking when the packed data element width is 8-bits, 4-bits may be used for masking when the packed data element width is 16-bits, and 2-bits may be used for masking when the packed data element width is 32-bits. As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits. Masks of any of these widths, or any combination of these widths, may be used in some embodiments.

Figure 7:
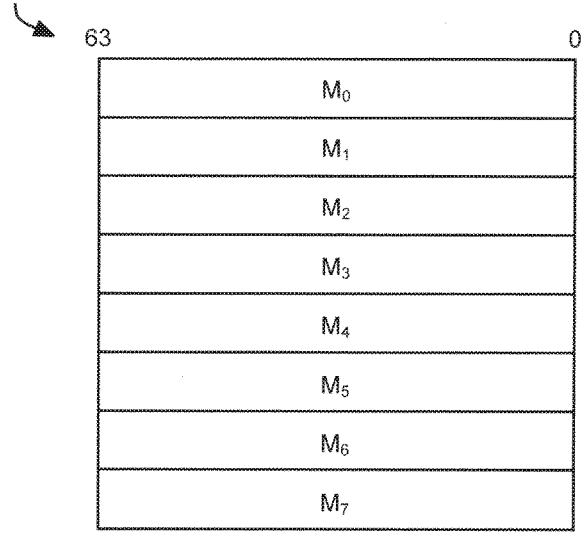
FIG. 7 is a block diagram of an example embodiment of a suitable set of packed data operation mask registers.

FIG. 7 is a block diagram of an example embodiment of a suitable set of packed data operation mask registers 712. Each of the packed data operation mask registers may be used to store a packed data operation mask. In some embodiments, the packed data operation mask registers may be a separate, dedicated set of architectural registers. In the illustrated embodiment, each of the packed data operation mask registers is 64-bits wide. In alternate embodiments, the widths of the packed data operation mask registers may be either narrower than 64-bits (e.g., 8-bits, 16-bits, 20-bits, 32-bits, etc.) or wider than 64-bits (e.g., 128-bits). In the illustrated embodiment, the set includes eight packed data operation mask registers labeled M0 through M7. Alternate embodiments may include either fewer than eight (e.g., one, two, three, four, five, six, etc.) or more than eight (e.g., twelve, sixteen, twenty, thirty-two, etc.) packed data operation mask registers. By way of example, the masked packed data instructions may use three bits (e.g., a 3-bit field) to encode or specify any one of the eight packed data operation mask registers M0 through M7. In alternate embodiments, either fewer or more bits may be used when there are fewer or more packed data operation mask registers, respectively. The packed data operation mask registers may be implemented in different ways using well known techniques and are not limited to any known particular type of circuit. Examples of suitable registers include, but are not limited to, dedicated physical registers, dynamically allocated physical registers using register renaming, and combinations thereof.

Figure 8:
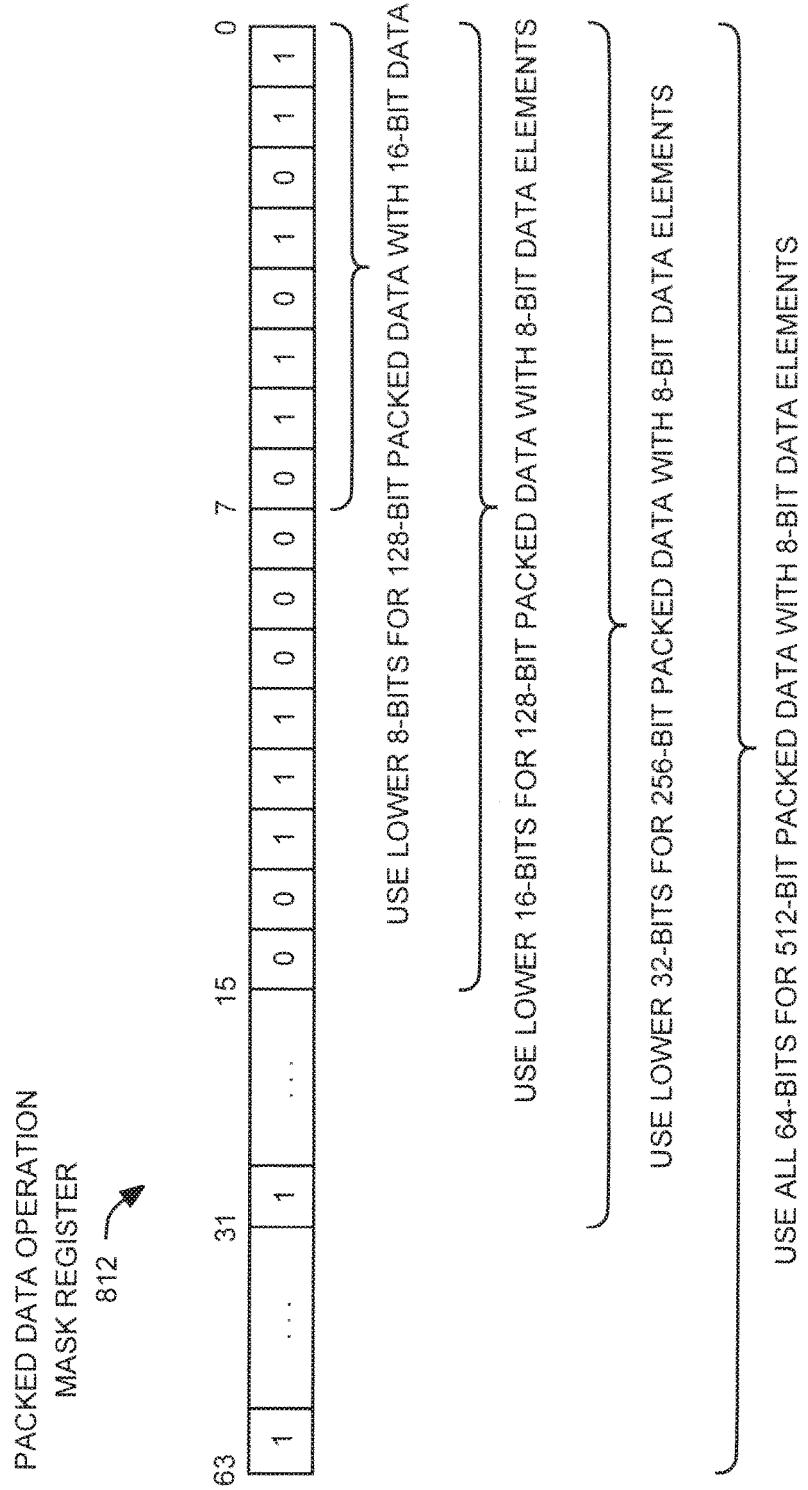
FIG. 8 is a diagram illustrating an embodiment of a packed data operation mask register and showing that the number of packed data operation mask bits depends upon the packed data width and the data element width.

FIG. 8 is a diagram illustrating an example embodiment of a packed data operation mask register 812 and showing that the number of bits that are used as a packed data operation mask and/or for masking depends upon the packed data width and the data element width. The illustrated example embodiment of the packed data operation mask register is 64-bits wide, although either narrower (e.g., 16-bit, 8-bit, etc.) or wider registers may be used instead. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data operand width in bits divided by the packed data element width in bits.

Several illustrative examples are shown. Namely, when the packed data width is 128-bits and the packed data element width is 16-bits, then only the lowest-order 8-bits of the register are used as the packed data operation mask. When the packed data width is 128-bits and the packed data element width is 8-bits, then only the lowest-order 16-bits of the register are used as the packed data operation mask. When the packed data width is 256-bits and the packed data element width is 8-bits, then only the lowest-order 32-bits of the register are used as the packed data operation mask. When the packed data width is 512-bits and the packed data element width is 8-bits, then all 64-bits of the register are used as the packed data operation mask. In accordance with the illustrated embodiment, a masked packed data instruction may utilize only the number of lowest order or least significant bits of the register used for the packed data operation mask based on that instructions associated packed data width and data element width. In the illustrated embodiment, the lowest-order subset or portion of the register is used for masking, although this is not required. In alternate embodiments a highest-order subset, or some other subset, may optionally be used.

FIG. 9 is a block diagram illustrating an embodiment in which a same physical register may be logically viewed and/or accessed as either a packed data register 908 or a packed data operation mask register 912. In a first view 940, the register may be viewed and/or accessed as a packed data register 908. The illustrated register is 64-bits wide. In the illustration, as an example, four 16-bit data elements A0-A3 are stored in the 64-bit packed data register. In other embodiments, either narrower (e.g., 32-bit) or wider (e.g., 128-bit, 256-bit, etc.) registers may be used. Moreover, in other embodiments, either narrower (e.g., 8-bit byte) or wider (e.g., 32-bit or 64-bit) data elements may be stored in the register as packed data.

In a second view 941, the same register may be viewed and/or accessed as a packed data operation mask register 912 that is operable to store a packed data operation mask. In the illustration, a 32-bit packed data operation mask M0 is stored in the lowest order 32-bits of the register (i.e., bits [31:0]). Each of the 32-bits may represent a mask element or element used for predication. All of the mask bits are contiguous or adjacent with one another. A remaining most significant 32-bits of the register (i.e., bits [63:32]) are not used for masking. These bits may represent don't care values (*), for example, all zeros, all ones, values which are simply ignored, any possible values, etc. In other embodiments, either narrower (e.g., 8-bit, 16-bit, etc.) or wider (e.g., 64-bit, etc.) masks may optionally be used. Either all of the bits in the register may be used for masking, or only a subset of the bits may be used for masking. In the illustrated example, the lowest order subset of the bits is used for masking. Alternatively a highest order subset or other subset of the bits may be used for masking.

FIG. 10 is a block diagram illustrating an embodiment in which a same physical register may be logically viewed and/or accessed as either a packed data register 1008 or a packed data operation mask register 1012 storing multiple (i.e., two or more) packed data operation masks. In a first view 1042, the register may be viewed and/or accessed as a packed data register 1008. The illustrated register is 64-bits wide. In the illustration, as an example, four 16-bit data elements A0-A3 are stored in the 64-bit packed data register. In other embodiments, either narrower (e.g., 32-bit) or wider (e.g., 128-bit, 256-bit, etc.) registers may be used. Moreover, in other embodiments, either narrower (e.g., 8-bit byte) or wider (e.g., 32-bit or 64-bit) data elements may be stored in the register as packed data.

In some embodiments, there may also be one or more other views, in which the same register may be viewed and/or accessed as a packed data operation mask register 1012 storing multiple (i.e., two or more) packed data operation masks. In the illustrated embodiment, there is a second view 1043, a third view 1044, and a fourth view 1045. Each of the second to fourth views has a different number of masks and size of masks. In other embodiments, there may be as few as a single view, in addition to the first view, in which the same register may be logically viewed and/or accessed as a packed data operation mask register 1012 storing multiple packed data operation masks.

In the second view 1043, eight different 8-bit masks M0-M7 are stored in the same packed data operation mask register 1012-1. For example, a first mask M0 is stored in the lowest order 8-bits of the register (i.e., bits [7:0]), a second mask M1 is stored in the next to lowest order 8-bits of the register (i.e., bits [15:8]), and so on. In the third view 1044, four different 16-bit masks M0-M3 are stored in the same packed data operation mask register 1012-2. For example, a first mask M0 is stored in the lowest order 16-bits of the register (i.e., bits [15:0]), a second mask M1 is stored in the next to lowest order 16-bits of the register (i.e., bits [31:16]), and so on. In the fourth view 1045, two different 32-bit masks M0-M1 are stored in the same packed data operation mask register 1012-3. For example, a first mask M0 is stored in the lowest order 32-bits of the register (i.e., bits [31:0]), a second mask M1 is stored in the next to lowest order 32-bits of the register (i.e., bits [64:32]). These are just a few examples of masks. In other embodiments, either narrower (e.g., two bit, four bit, etc.) or wider (e.g., 64-bit) masks may be used.

In some embodiments, for each of the second to fourth views, each of the masks may be used for a separate or different masked packed data operation. For example, a mask M0 may be indicated by a first masked packed data instruction and may be used to mask a corresponding packed data operation, another mask M1 may be indicated by a different masked packed data instruction and may be used to mask a different corresponding packed data operation, etc. Each mask may include contiguous/adjacent mask bits. In the masked packed data operations, as previously described, each bit may correspond to one or more different packed data elements (e.g., a pair of corresponding packed data elements).

In the illustration, the entire width of the register (i.e., in this example 64-bits) is used to store the multiple masks, although this is not required. In other embodiments, only a subset of the width of the register (e.g., a highest order subset, a lowest order subset, etc.) may be used to store the multiple masks. For example, only four 8-bit masks may be stored in the lowest order 32-bits of a 64-bit register, four 8-bit masks may be stored in the lowest order 32-bits of a 128-bit register, etc. Bits not used for masking may have don't care values.

FIG. 11 is a block diagram illustrating an embodiment in which the bits of a packed data operation mask 1112 are distributed among the data elements of a packed data 1108. This concept is illustrated through several example 32-bit doubleword (dword) formats. A 64-bit packed doubleword format 1146 is 64-bits wide and includes two 32-bit doubleword (dword) data elements of a packed data 1108-1. The two 32-bit doubleword data elements are labeled in the illustration from least to most significant bit positions as DWORD0 through DWORD1. DWORD0 is stored in bits [31:0] and DWORD1 is stored in bits [63:32]. A most significant bit of each of the doubleword data elements represents a mask bit of a packed data operation mask 1112-1 that is used for masking a packed data operation. In particular, in this format, bit [31] and bit [63] are the mask bits, and these mask bits collectively represent a packed data operation mask M0 1112-1.

A 128-bit packed doubleword format 1147 is 128-bits wide and includes four 32-bit doubleword (dword) data elements of a packed data 1108-2. The four 32-bit doubleword data elements are labeled in the illustration from least to most significant bit positions as DWORD0 through DWORD3. A most significant bit of each of the doubleword data elements represents a mask bit of a packed data operation mask 1112-2 that is used for masking a packed data operation. In particular, in this format, bit [31], bit [63], bit [95], and bit [127] are the mask bits, and these mask bits collectively represent a packed data operation mask M0 1112-2.

A 256-bit packed doubleword format 1148 is 256-bits wide and includes eight 32-bit doubleword (dword) data elements of a packed data 1108-3. The eight 32-bit doubleword data elements are labeled in the illustration from least to most significant bit positions as DWORD0 through DWORD7. A most significant bit of each of the doubleword data elements represents a mask bit of a packed data operation mask 1112-3 that is used for masking a packed data operation. In particular, in this format, bit [31], bit [63], bit [95], bit [127], bit [159], bit [191], bit [223], and bit [255] are the mask bits, and these mask bits collectively represent a packed data operation mask M0 1112-3.

In some cases, the masks may be implemented in operands that are the same size as packed data operands involved in the masked packed data operand, although in many cases the total number of mask bits may be equal to the total number of data elements. In these examples, the most significant bit of each data element represents the mask bit. In other embodiments, another bit within each data element may represent the mask bit (e.g., the least significant bit, etc.).

It is to be appreciated that these are just a few examples of suitable packed data formats. Narrower (e.g., 32-bit) or wider (e.g., 512-bit) packed data formats are also suitable. Moreover, for any of these packed data formats data elements either narrower than 32-bits (e.g., 8-bit bytes, 16-bit words, etc.) or wider than 32-bits (e.g., 64-bit quadwords, 64-bit double precision floating point, etc.) are also suitable. The packed 8-bit byte formats may have four times as many data elements and corresponding mask bits than the example 32-bit doubleword formats shown. The packed 16-bit word formats may have twice as many data elements and corresponding mask bits as the example 32-bit doubleword formats shown. The packed 64-bit quadword formats may have half as many data elements and corresponding mask bits as the example 32-bit doubleword formats shown. As one example, a 128-bit packed 8-bit byte format may have sixteen packed 8-bit byte data elements with the most significant bit of each byte representing a different mask bit and all sixteen bits collectively representing a packed data operation mask. Generally, the number of packed data elements and corresponding mask bits may be equal to the size in bits of the packed data divided by the size in bits of the packed data elements.

Figure 12:
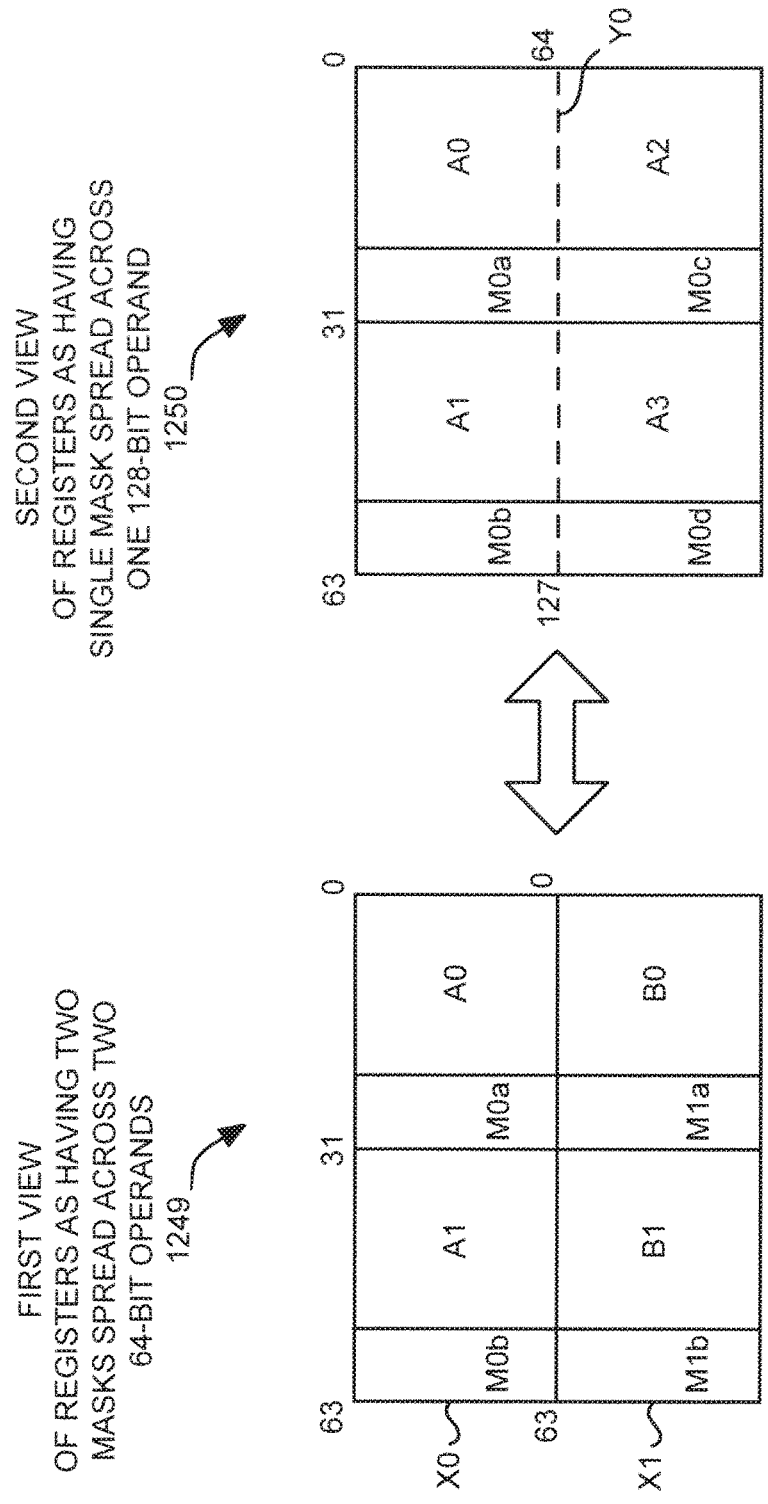
FIG. 12 is a block diagram illustrating an embodiment in which a set of registers having packed data operation mask bits that are distributed among data elements of packed data may be viewed or accessed in different views as storing two or more smaller masks or a single larger mask.

FIG. 12 is a block diagram illustrating an embodiment in which a set of registers having packed data operation mask bits that are distributed among data elements of packed data may be viewed or accessed in different views as storing two or more smaller masks or a single larger mask. In a first view 1249, the set of two registers (e.g., two 64-bit physical registers) are logically viewed or accessed as two 64-bit packed data registers labeled X0-X1. The registers X0-X1 may be registers specified by instructions of an instruction set to identify operands. Each of the two packed data registers X0-X1 may be operable to store a different 64-bit packed data operand. For example, in the illustrated embodiment, the 64-bit register X0 is used to store a first packed data operand having two 32-bit data elements A0-A1, and the 64-bit register X1 is used to store a second packed data operand having two 32-bit data elements B0-B1. In these packed data operands each of the packed data elements may have a corresponding mask bit. For example, in the illustrated embodiment, the most significant bit of each 32-bit data element represents a mask bit. In other embodiments, either narrower or wider data element sizes may be used instead and/or other bits besides the most significant bit may be used as the mask bits (e.g., the least significant bits within each data element, or any other desired bits). In the illustrated example embodiment, for the packed data register X0, a lowest order 32-bit data element has a mask bit M0$a$, and a highest order 32-bit data element has a mask bit M0$b$. The mask bits M0$a$ and M0$b$ represent a packed data operation mask M0. Similarly, for the packed data register X1, a lowest order 32-bit data element has a mask bit M1$a$, and a highest order 32-bit data element has a mask bit M1$b$. The mask bits M1$a$ and M1$b$ represent a packed data operation mask M1. In this first view, the mask bits in the two 64-bit registers X0-X1 (i.e., M0$a$, M0$b$, M1$a$, and M1$b$) are logically viewed as two different packed data operation masks (e.g., may be used by different masked packed data instructions for different masked packed data operations).

In a second view 1250, the same set of two registers (e.g., two 64-bit physical registers) are logically viewed or accessed as a single 128-bit packed data register Y0. The register Y0 may be a register specified by instructions of an instruction set to identify operands. In the second view 1250, the lowest order 64-bits (i.e., bits 63:0) of the 128-bit register Y0 maps or corresponds to the 64-bit register X0, whereas the highest order 64-bits (i.e., bits 127:64) of the 128-bit register Y0 maps or corresponds to the 64-bit register X1. Multiple (in this case two) smaller (in this case 64-bit) registers are logically combined or grouped to form a single larger (in this case 128-bit) register. The packed data register Y0 may be operable to store a 128-bit packed data operand having four 32-bit data elements A0-A3. Each of the packed data elements may have a corresponding mask bit. For example, in the illustrated embodiment, the most significant bit of each 32-bit data element represents a mask bit. In other embodiments, either narrower or wider data element sizes may be used instead and/or other bits besides the most significant bit may be used as the mask bits. In the illustrated example embodiment, the lowest order 32-bit data element A0 has a mask bit M0$a$, the 32-bit data element A1 has a mask bit M0$b$, the 32-bit data element A2 has a mask bit M0$c$, and the highest order 32-bit data element A3 has a mask bit M0$d$. The mask bits M0$a$, M0$b$, M0$c$, and M0$d$ represent a packed data operation mask M0. In this second view, the mask bits in the 128-bit register Y0 (i.e., M0$a$, M0$b$, M0$c$, and M0$d$) may be logically viewed as a single packed data operation mask (e.g., may be used by the same single masked packed data instruction for the same single masked packed data operation).

In the illustrated embodiment there are two different views. In other embodiments, there may be three or more different views. For example, a third view may view four of the 64-bit registers X0-X3 as a single 256-bit register Z0. In various embodiments, the actual physical registers used to implement the views may be 32-bit registers, 64-bit registers, or 128-bit registers, although the scope of the invention is not so limited. Either wider or narrower logical registers than 64-bits and 128-bits may be used. In the illustrated embodiment adjacent or sequential registers are used, although this is not required. In other embodiments, non-adjacent registers may be combined (e.g., non-adjacent registers in different banks, alternating registers, etc.).

As shown in FIGS. 9-12, in some embodiments, a set of packed data registers may be used as mask registers. In some embodiments, only a subset of the total number of packed data registers may be used as mask registers. For example, in one particular embodiment, only eight packed data registers of a larger set of packed data registers may be used for masking using one of the approaches shown in FIGS. 9-12. Advantageously, this may allow a given one of the registers to be specified as a source of one or more packed data operation mask with fewer bits needed for the specification (e.g., three bits in the case of eight registers). In some embodiments, a given or predetermined value in a set of bits to specify a mask register (e.g., a value of zero) may be used to disable masking so that increased efficiency may be achieved by avoiding unnecessary predication when not needed.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-oforder issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
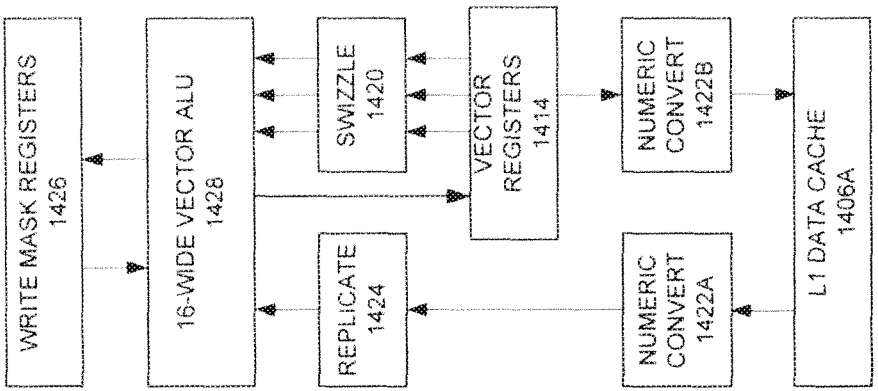
FIG. 14B is an expanded view of part of the processor core in FIG. 14A according to embodiments of the invention.
Figure 14A:
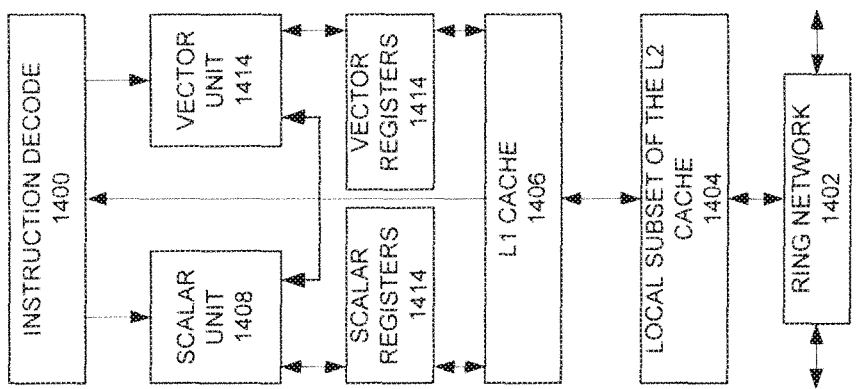
FIG. 14A is a block diagram of a single processor core, along with its connection to the on-die interconnect network and with its local subset of the Level 2 (L2) cache, according to embodiments of the invention.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Processor with Integrated Memory Controller and Graphics

Figure 15:
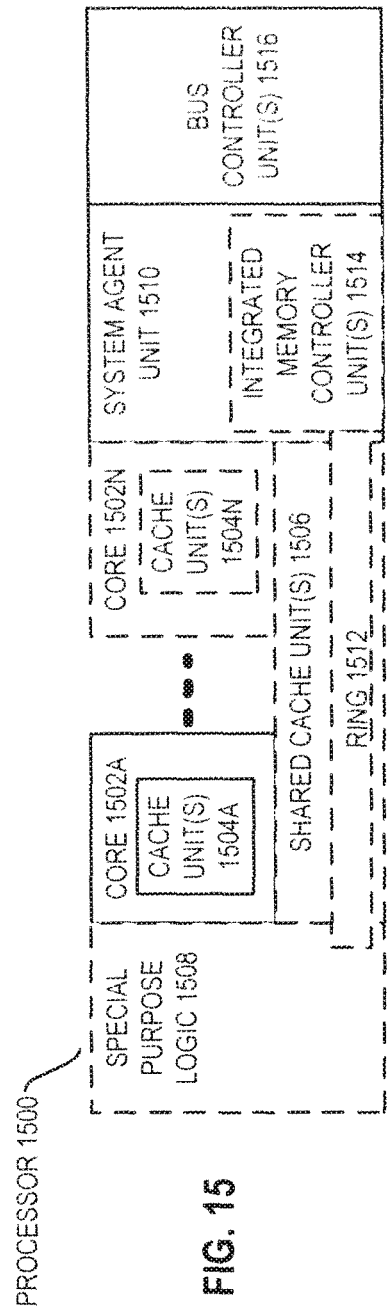
FIG. 15 is a block diagram of a processor that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
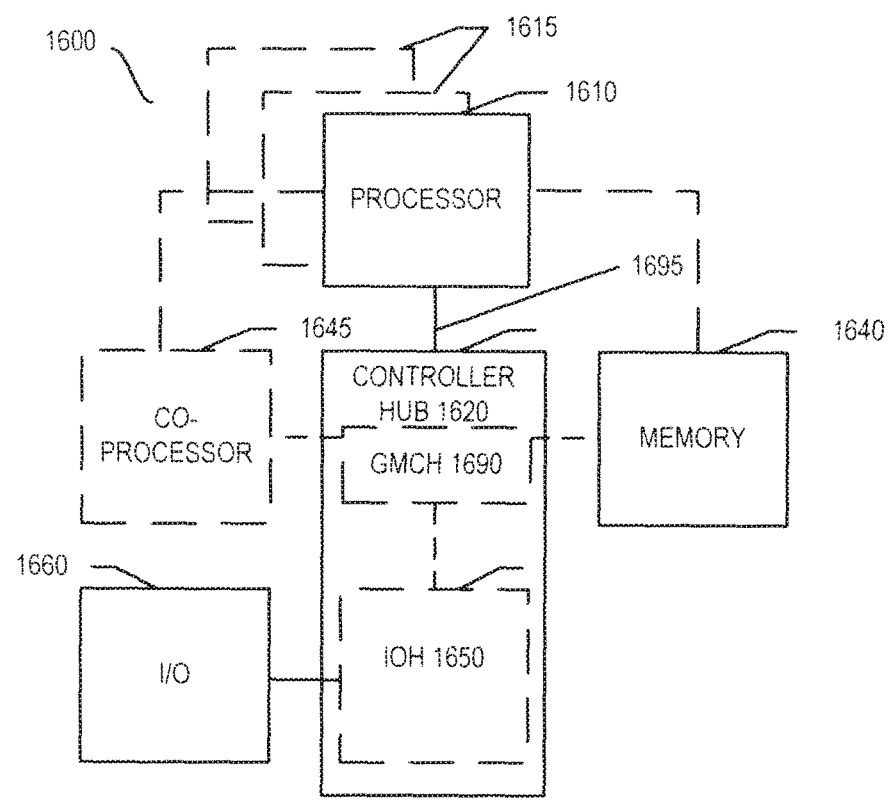
FIG. 16 shown is a block diagram of a system in accordance with one embodiment of the present invention.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
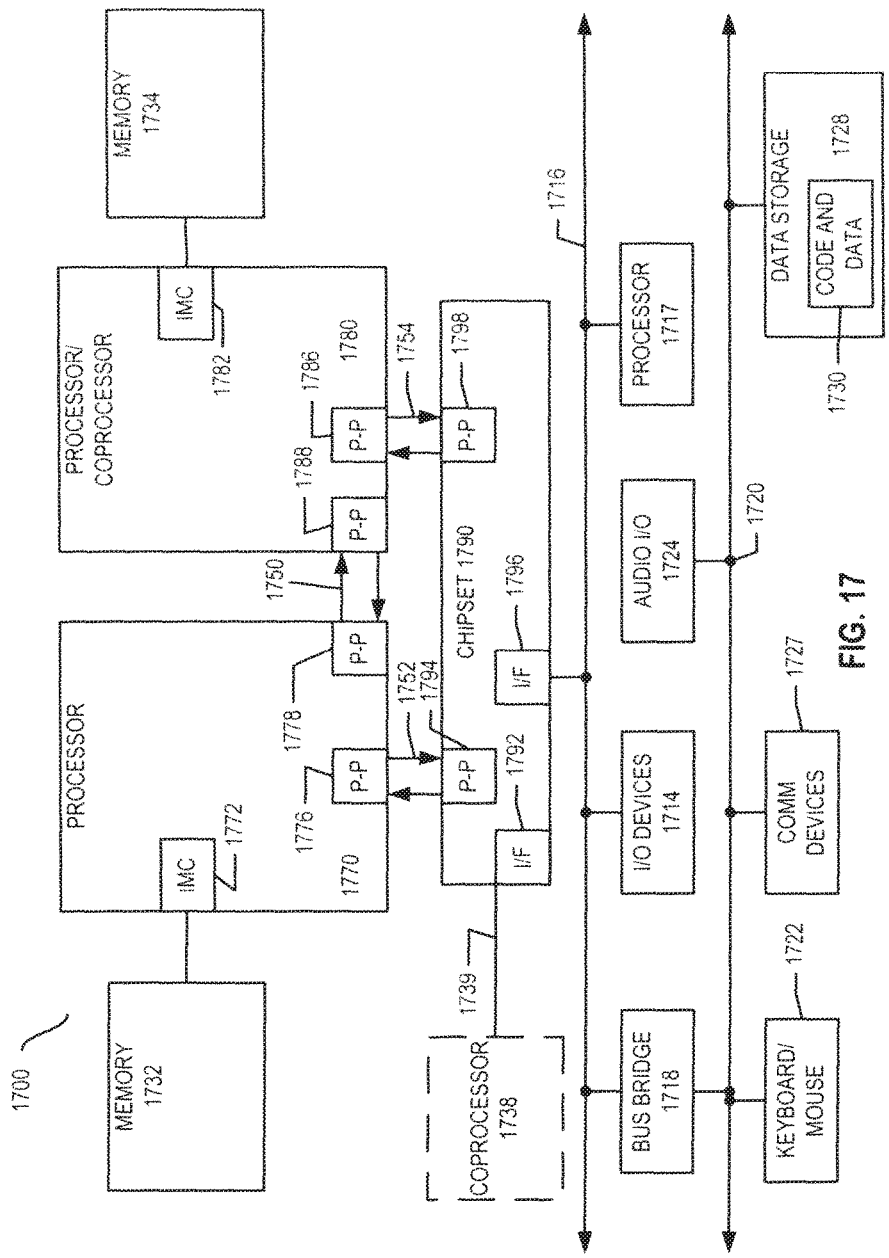
FIG. 17 shown is a block diagram of a first more specific exemplary system in accordance with an embodiment of the present invention.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
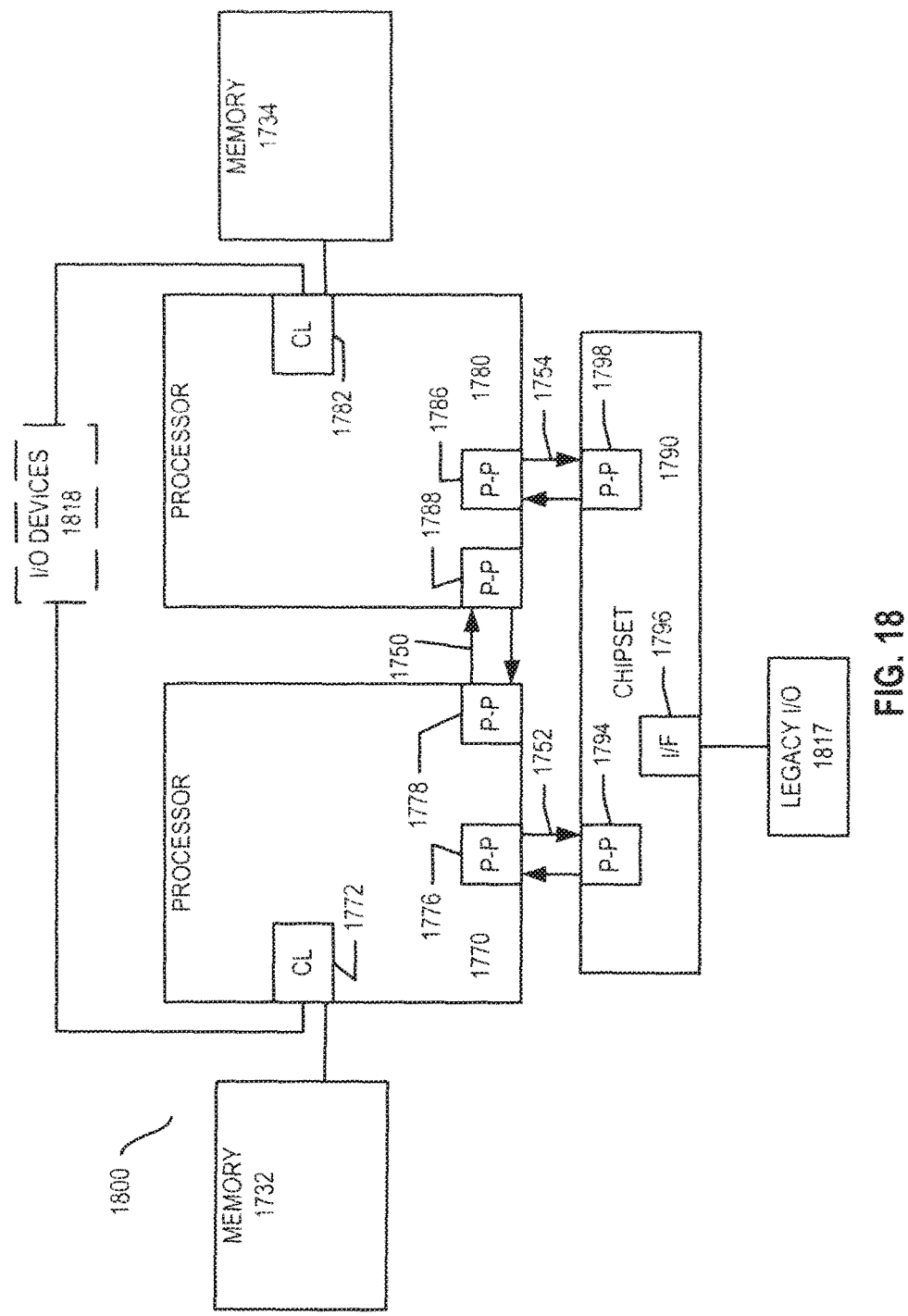
FIG. 18 shown is a block diagram of a second more specific exemplary system in accordance with an embodiment of the present invention.

Referring now to FIG. 18, shown is a block diagram of a second more specific exemplary system 1800 in accordance with an embodiment of the present invention. Like elements in FIGS. 17-18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
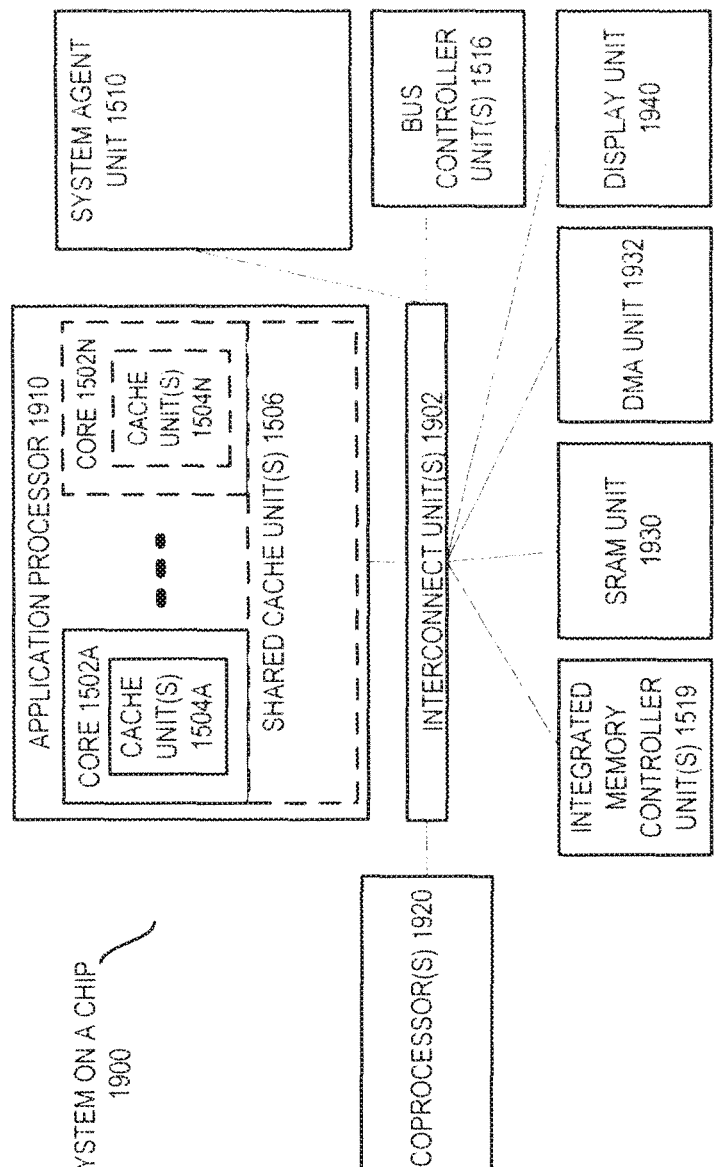
FIG. 19 shown is a block diagram of a SoC in accordance with an embodiment of the present invention.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
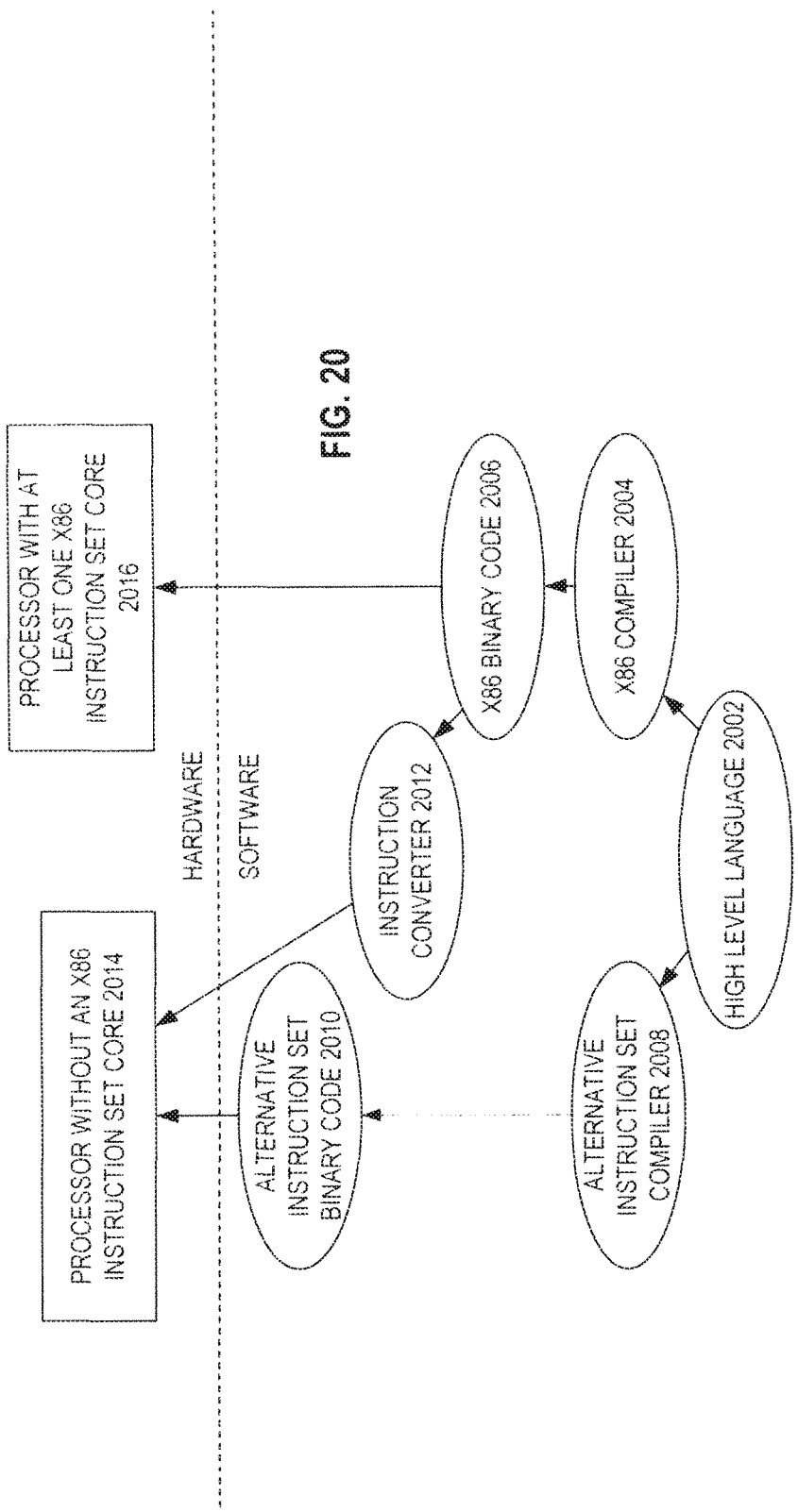
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Components, features, and details described for any of FIGS. 3-4 and/or FIGS. 6-12 may also optionally be used in any of FIGS. 1-2 and/or FIG. 5. Moreover, components, features, and details described herein for any of the apparatus may also optionally be used in any of the methods described herein, which in embodiments may be performed by and/or with such the apparatus.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decode unit through one or more intervening components. In the figures, arrows are used to show connections and couplings.

In the description and claims, the term "logic" may have been used. As used herein, logic may include hardware, firmware, software, or various combinations thereof. Examples of logic include integrated circuitry, application specific integrated circuits, analog circuits, digital circuits, programmed logic devices, memory devices including instructions, etc. In some embodiments, hardware logic may include transistors and/or gates potentially along with other circuitry components. In some embodiments, the logic may be embodied as a component, unit, or other module.

In the description above, specific details have been set forth in order to provide a thorough understanding of the embodiments. However, other embodiments may be practiced without some of these specific details. The scope of the invention is not to be determined by the specific examples provided above but only by the claims below. In other instances, well-known circuits, structures, devices, and operations have been shown in block diagram form or without detail in order to avoid obscuring the understanding of the description. Where multiple components have been shown and described, in some cases these multiple components may be incorporated into one component. Where a single component has been shown and described, in some cases this single component may be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a first mode optionally in which the processor is not to use packed data operation masking, and a second mode optionally in which the processor is to use packed data operation masking. The processor includes a decode unit to decode an unmasked packed data instruction for a given packed data operation in the first mode, and to decode a masked packed data instruction for a masked version of the given packed data operation in the second mode. The unmasked and masked packed data instructions have a same instruction length. The masked packed data instruction has one or more bits to specify a packed data operation mask. One or more execution units are coupled with the decode unit. The one or more execution units, in response to the decode unit decoding the unmasked packed data instruction in the first mode, are to perform the given packed data operation. The one or more execution units, in response to the decode unit decoding the masked packed data instruction in the second mode, are to perform the masked version of the given packed data operation using the specified packed data operation mask.

Example 2 includes the processor of Example 1, optionally in which the instruction length is 32-bits.

Example 3 includes the processor of Example 1, optionally in which the processor includes a reduced instruction set computing (RISC) processor.

Example 4 includes the processor of Example 1, further including a plurality of packed data registers. Also optionally in which the one or more bits of the masked packed data instruction are to specify a packed data register of the plurality as a source of the packed data operation mask.

Example 5 includes the processor of Example 4, optionally in which the packed data operation mask is to comprise a bit from each of a plurality of data elements of the packed data register.

Example 6 includes the processor of Example 4, optionally in which the packed data register is to store the packed data operation mask and at least one other packed data operation mask.

Example 7 includes the processor of Example 6, optionally in which in a first view the packed data register is to store a greater number of relatively smaller packed data operation masks and in a second view is to store a lesser number of relatively larger packed data operation masks.

Example 8 includes the processor of Example 1, further including a plurality of packed data operation mask registers. Also, optionally in which the one or more bits of the masked packed data instruction are to specify a packed data operation mask register of the plurality as a source of the packed data operation mask.

Example 9 includes the processor of any of Examples 1-8, optionally in which the first and second modes are to be indicated by one or more bits in a register of the processor.

Example 10 includes the processor of any of Examples 1-8, optionally in which the given packed data operation and the masked version of the given packed data operation includes one of: (1) a packed multiplication operation and a masked packed multiplication operation; (2) a packed addition operation and a masked packed addition operation; (3) a packed logical AND operation and a masked packed logical AND operation; (4) a packed logical OR operation and a masked packed logical OR operation; and (5) a packed compare operation and a masked packed compare operation.

Example 11 is a method performed by a processor. The method includes decoding an unmasked packed data instruction for a given packed data operation in a first mode in which the processor is not to use packed data operation masking. The method includes performing the given packed data operation in response to decoding of the unmasked packed data instruction in the first mode. The method includes decoding a masked packed data instruction for a masked version of the given packed data operation in a second mode in which the processor is to use packed data operation masking. The unmasked and masked packed data instructions have a same instruction length. The masked packed data instruction has one or more bits to specify a packed data operation mask. The method includes performing the masked version of the given packed data operation using the specified packed data operation mask in response to the decoding of the masked packed data instruction in the second mode.

Example 12 includes the method of Example 11, optionally in which decoding includes decoding the unmasked and masked packed data instructions that each have an instruction length of 32-bits.

Example 13 includes the method of Example 11, further including accessing the packed data operation mask from a packed data register specified by the one or more bits of the masked packed data instruction.

Example 14 includes the method of Example 13, optionally in which accessing includes accessing a bit from each of a plurality of data elements of the packed data register as the packed data operation mask.

Example 15 includes the method of Example 13, optionally in which accessing includes accessing the packed data operation mask from the packed data register that is also to store at least one other packed data operation mask.

Example 16 includes the method of Example 15, optionally in which accessing includes accessing the packed data operation mask from the packed data register that in a first view is to store a greater number of relatively smaller packed data operation masks and in a second view is to store a lesser number of relatively larger packed data operation masks.

Example 17 includes the method of Example 11, further including accessing the packed data operation mask from one of a plurality of packed data operation mask registers that is specified by the one or more bits of the masked packed data instruction.

Example 18 includes the method of Example 11, optionally in which the method is performed in a reduced instruction set computing (RISC) processor.

Example 19 includes the method of Example 11, further including changing one or more bits in a register of the processor to cause the processor to be in the second mode.

Example 20 includes the method of Example 11, optionally in which performing the given packed data operation and the masked version of the given packed data operation includes one of: (1) performing a packed multiplication operation and a masked packed multiplication operation; (2) performing a packed addition operation and a masked packed addition operation; (3) performing a packed logical AND operation and a masked packed logical AND operation; (4) performing a packed logical OR operation and a masked packed logical OR operation; and (5) performing a packed compare operation and a masked packed compare operation.

Example 21 is a system to process instructions. The system includes an interconnect, a dynamic random access memory (DRAM) coupled with the interconnect, and a processor coupled with the interconnect. The processor includes a first mode in which the processor is not to use packed data operation masking, and a second mode in which the processor is to use packed data operation masking. The processor includes a decode unit to decode an unmasked packed data instruction for a given packed data operation in the first mode, and to decode a masked packed data instruction for a masked version of the given packed data operation in the second mode. The unmasked and masked packed data instructions have a same instruction length. The masked packed data instruction has one or more bits to specify a packed data operation mask. The processor includes one or more execution units coupled with the decode unit. The one or more execution units, in response to the decode unit decoding the unmasked packed data instruction in the first mode, are to perform the given packed data operation. The one or more execution units, in response to the decode unit decoding the masked packed data instruction in the second mode, are to perform the masked version of the given packed data operation using the specified packed data operation mask.

Example 22 includes the system of claim 21, optionally in which the instruction length is 32-bits, and optionally in which the processor includes a reduced instruction set computing (RISC) processor.

Example 23 is a machine-readable storage medium storing instructions that if executed by a machine is to cause the machine to perform the method of any of Examples 11-20.

Example 24 is a processor to perform the method of any of Examples 11-20.

Example 25 is a processor including means for performing the method of any of Examples 11-20.

Example 26 is a processor including integrated circuitry and/or logic and/or units and/or components and/or modules, or any combination thereof, to perform the methods of any of Examples 11-20.

Example 27 is a computer system including at least one processor and optionally a dynamic random access memory (DRAM), the computer system to perform the method of any of Examples 11-20.

Example 28 is a processor to perform one or more operations or a method substantially as described herein.

Example 29 is a processor including means for performing one or more operations or a method substantially as described herein.

What is claimed is:

1. A processor comprising:
    a first register;
    a decode unit to decode an unmasked arithmetic packed data instruction for a given arithmetic packed data operation in a first mode in which the processor is not to use packed data operation masking, and to decode a masked arithmetic packed data instruction for a masked version of the given arithmetic packed data operation in a second mode in which the processor is to use the packed data operation masking, the first and second modes to be indicated by one or more bits in the first register, the unmasked and masked arithmetic packed data instructions having a same instruction length; and
    one or more execution units coupled with the decode unit, the one or more execution units, in response to the decode unit decoding the unmasked arithmetic packed data instruction in the first mode to perform the given arithmetic packed data operation, without the packed data operation masking, and store a result in a destination, and in response to the decode unit decoding the masked arithmetic packed data instruction in the second mode to perform the masked version of the given arithmetic packed data operation, using a packed data operation mask, and store a result in a destination.

2. The processor of claim 1, wherein the instruction length is 32-bits.

3. The processor of claim 1, wherein the processor comprises a reduced instruction set computing (RISC) processor.

4. The processor of claim 1, further comprising a plurality of packed data registers, and wherein one or more bits of the masked arithmetic packed data instruction are to specify a packed data register of the plurality as a source of the packed data operation mask.

5. The processor of claim 4, wherein the packed data operation mask is to comprise a bit from each of a plurality of data elements of the packed data register.

6. The processor of claim 4, wherein the packed data register is to store the packed data operation mask and at least one other packed data operation mask at a same time.

7. The processor of claim 6, wherein in a first view the packed data register is to store a greater number of relatively smaller packed data operation masks at a same time and in a second view is to store a lesser number of relatively larger packed data operation masks at a same time.

8. The processor of claim 1, further comprising a plurality of architectural packed data operation mask registers, and wherein one or more bits of the masked arithmetic packed data instruction are to specify an architectural packed data operation mask register of the plurality as a source of the packed data operation mask.

9. The processor of claim 1, wherein the first register is one of a control register and a configuration register.

10. The processor of claim 1, wherein the given arithmetic packed data operation and the masked version of the given arithmetic packed data operation are one of:
    a packed multiplication operation and a masked packed multiplication operation;
    a packed addition operation and a masked packed addition operation;
    a packed logical AND operation and a masked packed logical AND operation;
    a packed logical OR operation and a masked packed logical OR operation; and
    a packed compare operation and a masked packed compare operation.

11. The processor of claim 1, wherein the masked arithmetic packed data instruction has one or more bits to specify the packed data operation mask.

12. The processor of claim 1, wherein the masked arithmetic packed data instruction has a field to specify whether zero masking or merge masking is to be used.

13. The processor of claim 1, wherein the unmasked arithmetic packed data instruction is an unmasked arithmetic packed data multiply instruction, and the masked arithmetic packed data instruction is a masked arithmetic packed data multiply instruction.

14. The processor of claim 1, wherein the unmasked arithmetic packed data instruction is an unmasked arithmetic packed data add instruction, and the masked arithmetic packed data instruction is a masked arithmetic packed data add instruction.

15. A system to process instructions comprising:
a Peripheral Component Interconnect (PCI) Express bus; and
a processor coupled with the PCI Express bus, the processor comprising:
a first register;
a decode unit to decode an unmasked arithmetic packed data instruction for a given arithmetic packed data operation in a first mode in which the processor is not to use packed data operation masking, and to decode a masked arithmetic packed data instruction for a masked version of the given arithmetic packed data operation in a second mode in which the processor is to use the packed data operation masking, the first and second modes to be indicated by one or more bits in the first register, the unmasked and masked arithmetic packed data instructions having a same instruction length; and
one or more execution units coupled with the decode unit, the one or more execution units, in response to the decode unit decoding the unmasked arithmetic packed data instruction in the first mode to perform the given arithmetic packed data operation, without the packed data operation masking, and store a result in a destination, and in response to the decode unit decoding the masked arithmetic packed data instruction in the second mode to perform the masked version of the given arithmetic packed data operation, using a packed data operation mask, and store a result in a destination.

16. A processor comprising:
a decode unit to decode an unmasked logical AND packed data instruction for a logical AND packed data operation in a first mode in which the processor is not to use packed data operation masking, and to decode a masked logical AND packed data instruction for a masked version of the logical AND packed data operation in a second mode—in which the processor is to use the packed data operation masking, the unmasked and masked logical AND packed data instructions having a same instruction length; and
one or more execution units coupled with the decode unit, the one or more execution units, to entirely perform the unmasked logical AND packed data instruction in the first mode, without the packed data operation masking, and store a result in a destination, the one or more execution units, to entirely perform the masked logical AND packed data instruction in the second mode, using a packed data operation mask, and store a result in a destination.

17. The processor of claim 16, wherein the first and second modes are to be indicated by one or more bits in one of a control register and a configuration register of the processor.

18. The processor of claim 16, further comprising a plurality of architectural packed data operation mask registers, and wherein one or more bits of the masked logical AND packed data instruction are to specify an architectural packed data operation mask register of the plurality as a source of the packed data operation mask.

19. The processor of claim 16, further comprising a plurality of packed data registers, and wherein one or more bits of the masked logical AND packed data instruction are to specify a packed data register of the plurality as a source of the packed data operation mask.

20. The processor of claim 19, wherein the packed data register is to store the packed data operation mask and at least one other packed data operation mask at a same time.

21. The processor of claim 19, wherein the packed data operation mask is to comprise a bit from each of a plurality of data elements of the packed data register.

22. A processor comprising:
a decode unit to decode an unmasked logical OR packed data instruction for a logical OR packed data operation in a first mode in which the processor is not to use packed data operation masking, and to decode a masked logical OR packed data instruction for a masked version of the logical OR packed data operation in a second mode—in which the processor is to use the packed data operation masking, the unmasked and masked logical OR packed data instructions having a same instruction length; and
one or more execution units coupled with the decode unit, the one or more execution units, to entirely perform the unmasked logical OR packed data instruction in the first mode, without the packed data operation masking, and store a result in a destination, the one or more execution units, to entirely perform the masked logical OR packed data instruction in the second mode, using a packed data operation mask, and store a result in a destination.

* * * * *